(12) United States Patent
Takamine

(10) Patent No.: US 7,239,414 B2
(45) Date of Patent: Jul. 3, 2007

(54) DATA PROCESSING CONTROL APPARATUS, DATA PROCESSING CONTROL METHOD AND SYSTEM THEREOF

(75) Inventor: Kouichi Takamine, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1013 days.

(21) Appl. No.: 10/290,504

(22) Filed: Nov. 8, 2002

(65) Prior Publication Data

US 2003/0096581 A1  May 22, 2003

(30) Foreign Application Priority Data

Nov. 8, 2001 (JP) .............................. 2001-342838

(51) Int. Cl.
*H04N 1/32* (2006.01)
(52) U.S. Cl. ..................................... 358/1.15; 358/468
(58) Field of Classification Search ................. 358/1.9, 358/1.15–1.16, 436, 468; 345/625–626, 345/634–635
See application file for complete search history.

(56) References Cited

U.S. PATENT DOCUMENTS 6,233,279 B1 * 5/2001 Boon ..................... 375/240.08
6,771,278 B2 * 8/2004 Shigeta ........................ 345/634
6,839,386 B2 * 1/2005 Sato et al. ............. 375/240.25
6,961,465 B2 * 11/2005 Shah ........................... 382/181

FOREIGN PATENT DOCUMENTS

| EP | 467598 A2 * | 1/1992 |
| JP | 2000-242389 | 9/2000 |
| JP | 2001-265631 | 9/2001 |

* cited by examiner

*Primary Examiner*—Thomas D. Lee
*Assistant Examiner*—Stephen Brinich
(74) *Attorney, Agent, or Firm*—McDermott Will & Emery LLP

(57) ABSTRACT

It is not possible to display image data exchanged between portable terminals with different output capabilities. The data processing control apparatus processes processing object data based on the output capability of an output device capable of outputting the processing object data such as image data, and outputs to the output device the processed data that is the processed processing object data. Therefore, the processing object data was converted to the data adapted for the output capability of the output device so that the output device can output any processing object data.

35 Claims, 16 Drawing Sheets

FIG.2A

| SPECIFYING INFORMATION | OUTPUT CAPABILITY INFORMATION 202 | |
|---|---|---|
| 201 | NUMBER OF DOTS | FILE FORMAT |
| 210. 145. 108. 01 | 120×160 | JPEG |
| 210. 145. 108. 02 | 1024×768 | JPEG GIF bit map etc. |
| 210. 145. 108. 03 | 640×480 | JPEG GIF |

| | ATTRIBUTE INFORMATION | | | | |
|---|---|---|---|---|---|
| FILE NAME | NUMBER OF PIXELS | DATA SIZE | FILE FORMAT | DIRECTORY NAME | PROCESSING OBJECT DATA |
| Image001 | 240×320 | 200byte | bit map | 210. 145. 108. 01 | ---------- |
| Image002 | 1024×768 | 660byte | JPEG | 210. 158. 122. 11 | ---------- |
| Image003 | 840×600 | 350byte | GIF | 210. 146. 104. 06 | ---------- |

211  212

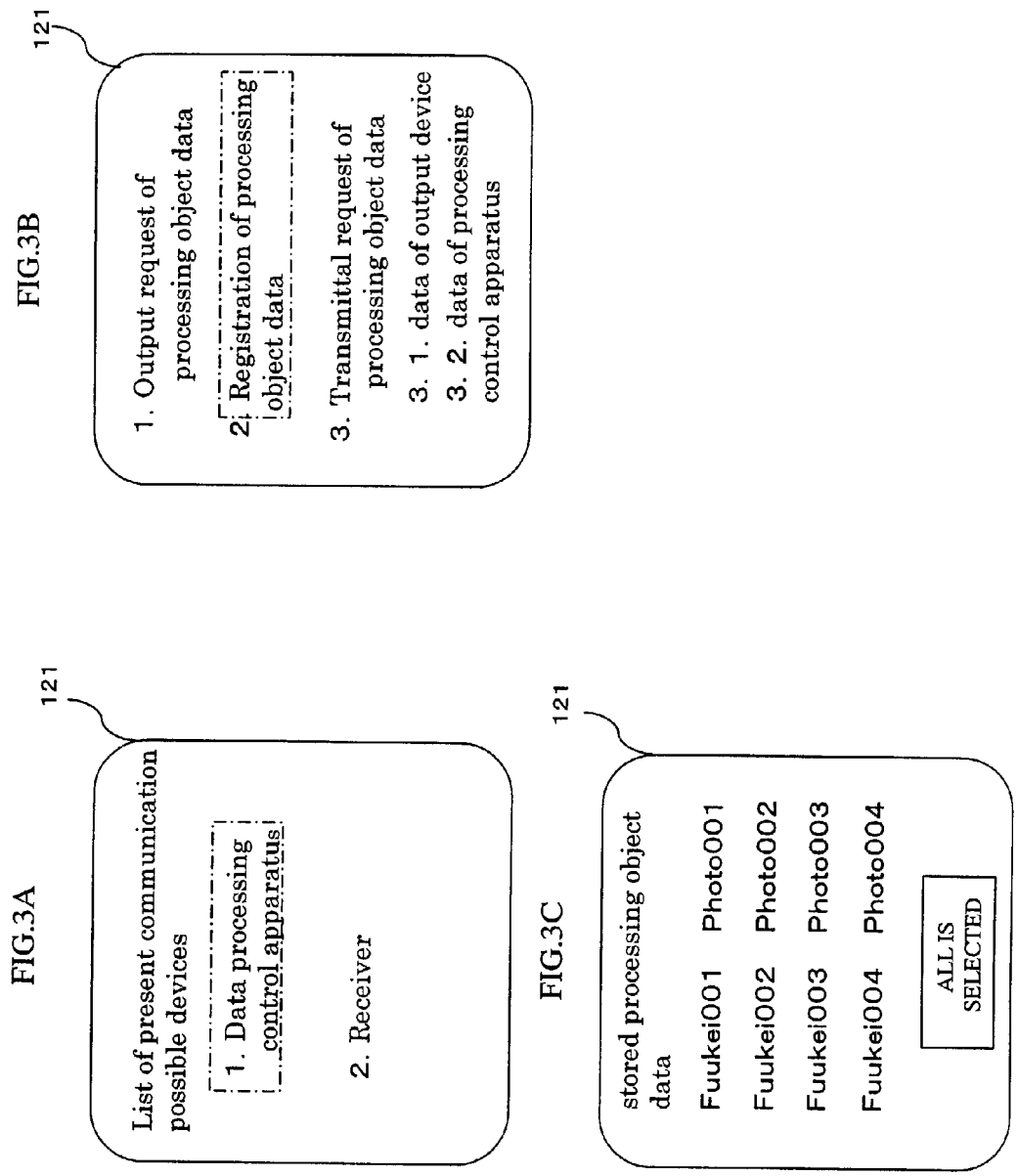

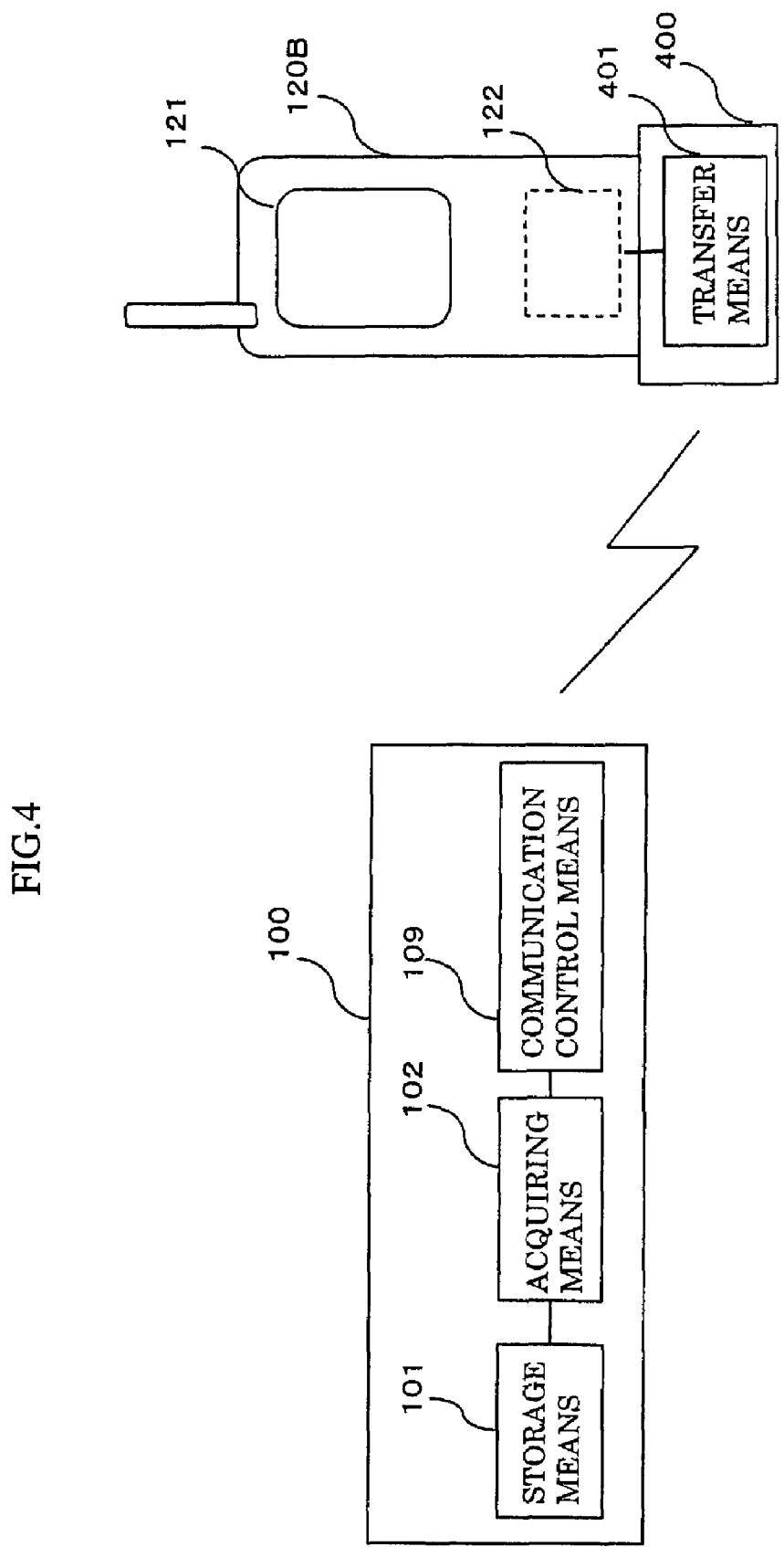

FIG.6A

List of processing object data stored in data processing control apparatus

| FILE NAME | NUMBER OF DOTS | DATA SIZE | FILE FORMAT |
|---|---|---|---|
| Image001 | 240×360 | 55kbyte | GIF |
| Image002 | 1024×768 | 402kbyte | GIF |
| Wallpaper 003 | 240×320 | 50kbyte | JPEG |
| Wallpaper 004 | 840×600 | 288kbyte | JPEG |

FIG.6B

List of processing object data stored in data processing control apparatus

| FILE NAME | NUMBER OF DOTS | DATA FILE SIZE FORMAT |
|---|---|---|
| Image001 | 240×360 | 55kbyte GIF |
| Image002 | 1024×768 | 402kbyte GIF |
| Wallpaper 003 | 240×320 | 50kbyte JPEG |
| Wallpaper 004 | 840×600 | 288kbyte JPEG |

FIG.6C

Output capability of monitor:
NUMBER OF DOTS 120×160
FILE FORMAT JPEG

Attribute information of processing object data:
FILE NAME Image001
NUMBER OF PIXELS 240×360
DATA SIZE 55kbyte
FILE FORMAT GIF Process the processing object file or not?

[YES]   [NO]

FIG9.A
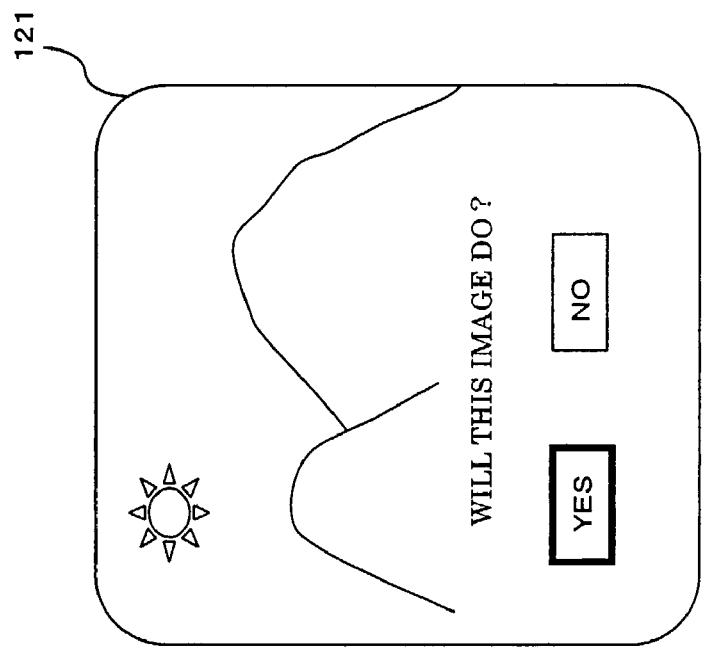
FIG9.B
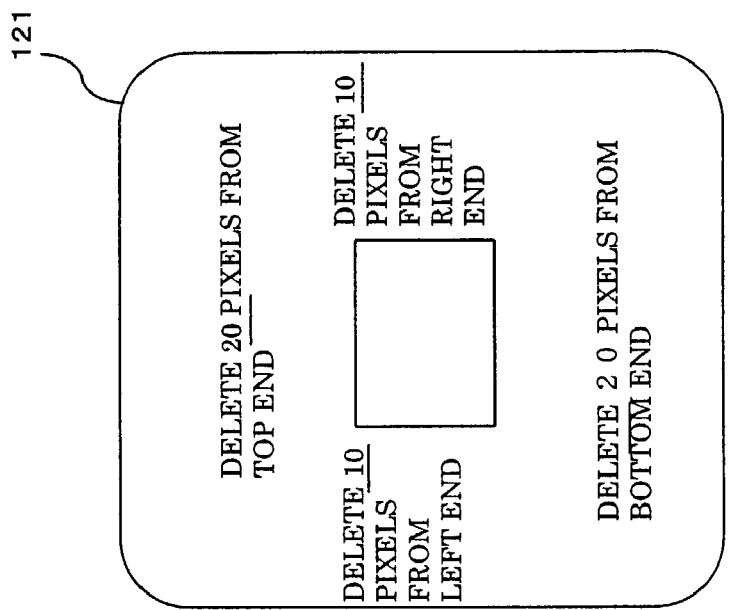

DATA PROCESSING CONTROL APPARATUS, DATA PROCESSING CONTROL METHOD AND SYSTEM THEREOF

BACKGROUND OF THE INVENTION

1. Field of the Invention

This invention relates to a data processing control apparatus, a data processing control method and a system, which process and control data to be transferred to a plurality of terminals.

2. Description of the Related Art

In recent years, according to the progress of both the digital technology and the network technology, the portable terminal gets to be used in various places near at hand. The portable terminal is a mobile phone, PDA (Personal Digital Assistance), and so on. In particular, the mobile phone, which is a typical portable terminal, has become popular explosively on the occasion when the mobile phone is provided with the function of Internet-access service for transmitting and receiving the electronic mail and for receiving information providing services provided by WWW (World Wide Web). And W-CDMA (Wideband Code Division Multiple Access), which is the mobile communication system for the next generation, makes it possible to transmit data at a high speed, and in result it is possible to perform the real time communication by means of the dynamic image or the voice.

The above-mentioned mobile phone provided with the Internet-access service can be connected with Internet, through which the user of the mobile phone can download image data and etc. In addition, the user uses the downloaded image data as wallpaper or as file attached to mail.

Moreover, as the digital technology and the network technology improve, the data storage service (photo album service), and etc. are also developed; the data storage service can allow the portable terminal, such as the mobile phone, to browse the data stored in the server. According to such service, it is possible for the portable terminal to browse the image data stored in the server.

However, the portable terminal is limited in its memory size or the monitor size in order to downsize or for weight saving, therefore the resolution (the number of pixels) of the monitor is very low compared to that of TV or personal computer. Accordingly, even when the server for the data storage service stores image data with 480 (width)×640 (length) pixels, the monitor of the portable terminal of 120 (width)×160 (length) dots can only do display 1/16 of the whole image. For this reason, the user must scroll the image to see the other parts of image not displayed on the monitor. In such way, there are occasions when the monitor with the low resolution cannot display the whole of image simultaneously. In this case, it is hard for the user to know the whole of image data. Additionally, there are occasions when the portable terminal is arranged so as not to receive the image data having the number of pixels more than the number of dots on the monitor. Such portable terminal cannot display on the monitor the image data having the many number of pixels.

Furthermore, even though the server stores the image data generated in the file format (JPEG, GIF, MPEG, etc. for example) to which the portable terminal such as the mobile phone, PDA and etc and the terminal device of the personal computer are not corresponding, those terminal devices cannot display the image data.

And the display capability of the monitor of the terminal device is varied depending on the type of device, for this reason there are occasions when the monitor cannot display the image data transmitted from the other terminal device with the different display capability.

SUMMARY OF THE INVENTION

The data processing control apparatus of this invention processes processing object data to processed data adapted for the output capability of an output device (monitor, for example), and then outputs the processed data to the output device, in response to the output request to output the processing object data to the output device issued from an output request device.

The processing of the processing object data is executed by processing means provided to the processing data control apparatus. In order to make the processing means generate the processed data adapted for the output capability of the output device, the data processing control apparatus is provided with providing means for providing the processing object data, the attribute information of the processing object data, and the output capability information of the output device to the processing means.

The providing means can utilize storage means provided to the data processing control apparatus and for storing the processing object data, the attribute information, and the output capability information, or can utilize communication control means for communicating with an external device holding the processing object data, the attribute information and the output capability information.

In addition, the providing means may be composed of both the storage means and the communication control means. For instance, though the processing object data, the attribute information and the output capability information that are necessary for the processing of the processing object data, the processing object data and the attribute information among them may be stored in the storage means and the output capability information among them may be stored in the external device.

By processing the processing object data depending on the output capability of the output device as the above, the processed data can be outputted to the monitor of the output device regardless to the attribute information of the processing object data.

Besides, the output request device may be different from or be the same as the output device. In case of the same device, the output request device can receive the processed data adapted for the output capability of the output request device.

BRIEF DESCRIPTION OF THE DRAWINGS

FIG. 2A and FIG. 2B are conceptual diagrams of the storage means of the data processing control apparatus.

FIG. 3A, FIG. 3B, and FIG. 3C are diagrams showing the monitor outputting, registering, and transmitting the processing object data.

FIG. 4 is an schematically functional block diagram of the battery charger and the data processing control apparatus.

FIG. 6A, FIG. 6B, and FIG. 6C are diagrams showing the monitors when the processing object data to be processed is selected.

FIG. 9A and FIG. 9B are diagrams showing the monitors when specific pixels in the processing object data are deleted.

DESCRIPTION OF THE PREFERRED EMBODIMENTS

Figure 1:
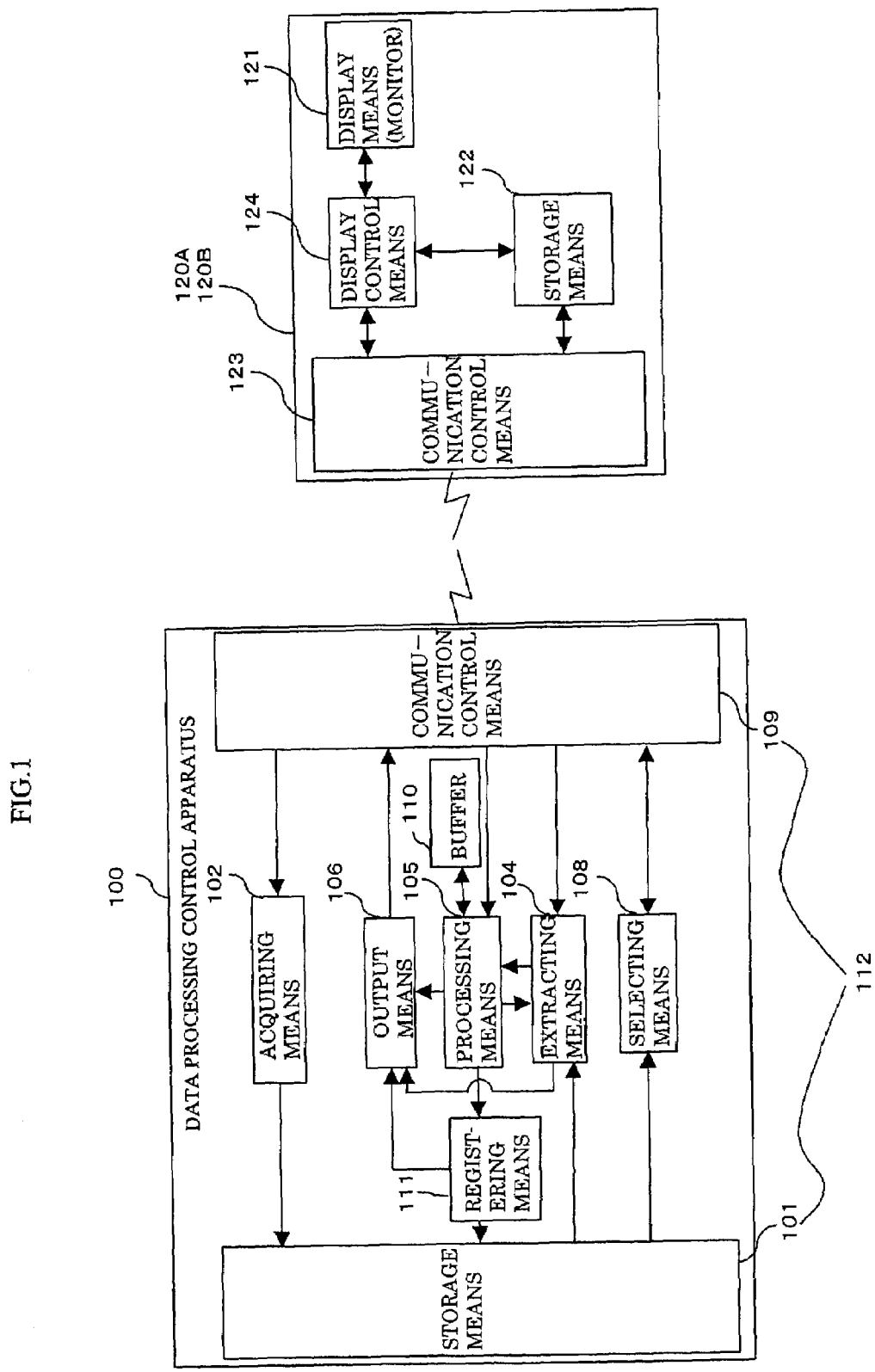
FIG. 1 is a block diagram of the data processing control system.

The data processing control apparatus 100 shown in FIG. 1 is provided with storage means 101 as providing means 112. The storage means 101 stores output device information 200 of following output device 120B. The output device information 200 is the information of the output capability of the output device 120B such as the mobile phone, PDA, the personal computer, and TV. The data processing control apparatus 100 is provided as hardware or software to the image producing apparatus like the printer and the copying machine, to the broadcast receiver like Set Top Box and TV, to the gateway, or to the home server.

The output device information 200 is composed of specifying information 201 specifying the specific output device 120B and output capability information 202 pertaining to the output capability of display means 121 included in the output device 120B, as shown in FIG. 2(a). The specifying information 201 is the IP address, MAC address, and serial number of the output device 120B, for example, and for specifying the output device 120B. The output capability information 202 is composed of the resolution (the number of dots) of the display means 121, and the file format (JPEG, GIF, or MPEG) that the display means 121 can output.

In addition, the storage means 101 stores the processing object data 212 of the image or dynamic image data and the attribute information 211 pertaining to the processing object data 212 correlating them with each other. The attribute information 211 is composed of the directory name storing the file name, the data size, the number of pixels, the file format (JPEG, GIF, or MPEG, for example) of the processing object data 212, and the processing object data 212, as shown in FIG. 2(b).

Besides, in case where the output device information 200 is registered to the storage means 101, the user of the output device 120B connects the output device 120B and the data processing control apparatus 100 through LAN or Internet so as to communicate each other, and then transmits to the data processing control apparatus 100 the output device information 200 stored in ROM of the output device 120B. The output device information 200 thus transmitted is acquired by acquiring means 102 through communication control means 109 of the data processing control apparatus 100, and registered to the storage means 101 by the acquiring means 102.

Besides, the processing object data 212 and the attribute information 211(which is called "processing object data and etc." hereinafter) may be stored originally on a specific Website, in storage means 122 included in the output device 120B or in output request device 120A sending an output request to output to the output device 120B, otherwise the data stored in a storage medium such as CD-R, DVD-R, and SD-card.

In case where the processing object data on Website is stored in the storage means 101, the user of the data processing control apparatus 100 connects the data processing control apparatus 100 with the specific Website through Internet. That is to say, when the user selects the specific image data displayed on the monitor 121 of the data processing control apparatus 100 by a mouse or the like, the acquiring means 102 acquires the image data (the processing object data 212) and the attribute information 211 of the image data through communication control means 109 and then registers them to the storage means 101.

Where the processing object data and etc. stored in the storage medium like CD-R, DVD-R, and SD-card is stored in the storage means 101, the user inserts the each storage medium into a drive of the data processing control apparatus 100. Thereby the acquiring means 102 acquires the processing object data and etc. from the storage medium and then registers them to the storage means 101.

The processing object data and etc. stored in the output device 120B, such as in the storage means 122 of the mobile phone 120B, can be registered to the storage means 101, in case where the mobile phone 120B can communicate with the data processing control apparatus 100.

For instance, the user of the mobile phone 120B changes the mobile phone 120B to the wireless LAN mode. After changing to the wireless LAN mode, the communication control means 123 of the mobile phone 120B detects an external device connected with the wireless LAN. At this moment, it is assumed that the communication control means 123 detect the data processing control apparatus 100 and a receiver with a built-in STB (Set Top Box) as the communication possible external device connected with the mobile phone 120B via wireless LAN. Besides. And the external device detected by the communication control device 123 may be the one connected with the communication control means 123 via LAN cable or Internet.

When the communication control device 123 detects the data processing control apparatus 100 and the receiver as the communication possible external device, display control means 124 of the mobile phone 120B displays on the monitor 121 of the mobile phone 120B "1. Data processing device, 2. Receiver" as "a list of present communication possible devices" shown in FIG. 3(a).

At this moment, the user selects a communication opponent of the mobile phone 120B by a cursor key provided to the mobile phone 120B (in this case, "1. Data processing control apparatus" is selected). After selecting the communication opponent in such way, the communication control means 123 displays on the monitor 121 "1. Output request of processing object data, 2. Registration of processing object data, 3. Transmittal request of processing object data", as shown in FIG. 3(b). In this case, in order to register the processing object data 212 to the storage means 101, the user selects "2. Registration of processing object data" by the cursor key provided to the mobile phone 120B.

After selecting "2. Registration of processing object data", the display control means 124 displays a list of file names of processing object data stored in the storage means 122, as shown in FIG. 3(c).

When the list of file names is displayed on the monitor 121, the user selects by the cursor key of the mobile phone 120B a file name of the processing object data 212 which he wants to register in the storage means 101. Besides, when he selects all the displayed file names, the user selects an area displaying "select all" on the monitor 121.

According to the above-mentioned sequence, when the processing object data 212 to be an object of registration is selected, the communication control means 123 transmits the selected processing object data 212, the attribute information 211 of the selected processing object data 212, and the specifying information 201 of the mobile phone 120B to the data processing control apparatus 100.

When receiving the processing object data and etc. and the specifying information 201 transmitted from the mobile phone 120B through the communication control means 109, the acquiring means 102 registers the received processing object data and etc. to the storage means 101.

Beside, the method of registering the processing object data 212 stored in the output request device 120A to the storage means 101 can be executed in the same way that the processing object data stored in the output device 120B is registered to the storage means 101.

Besides, it may provide battery chargers 400 of the output request device 120A and output device 120B shown in FIG. 4 with transfer means 401 for transfer to the acquiring means 102 of the data processing control apparatus 100 the processing object data and so on stored in the storage means 121 of the output request device 120A and the output device 120B. By providing the battery charger 400 with the transfer means 401, the processing object data and etc. stored in the output request device 120A and the output device 120B can be transferred to the data processing control apparatus 100 during the charging time.

The following description relates to a case of outputting the processing object data 212 stored in storage means 101 to the output device 120B having the storage means 101 storing the output capability information 202 and the specifying information 201 as mentioned above.

Beside, in the following embodiments 1 to 6,since there are occasions when a mobile phone functions as the output device 120B combined with the output request device 120A, if the mobile phone functions as the output request device 120A, the reference numeral of the mobile phone should be 120A, and if functions as the output device 120B, the reference numeral of the mobile phone should be 120B.

Embodiment 1

In this embodiment and embodiments 2 and 3, the mobile phone functions as the output request device 120A combined with the output device 120B.

In order to select the image for wall paper of the monitor 121 of the mobile phone 120B from the processing object data 212 stored in the storage means 101, the user of the output device 120 (the mobile phone 120A) operates the mobile phone to display a list of the processing object data 212 stored in the storage means 101.

First, the user selects the data processing control apparatus 100 as the communication opponent of the mobile phone 120A, as shown in FIG. 3(a), and then selects "1. Output request of processing object data" as shown in FIG. 3(b). At selecting "1. Output request of processing object data", in order to acquire the processing object data 212 stored in the storage means 101 of the data processing control apparatus 100, the communication control means 123 transmits to the data processing control apparatus 100 a extracting request to extract the processing object data 212 and the specifying information 201 of the mobile phone 120A (FIG. 5, S501).

Figure 5:
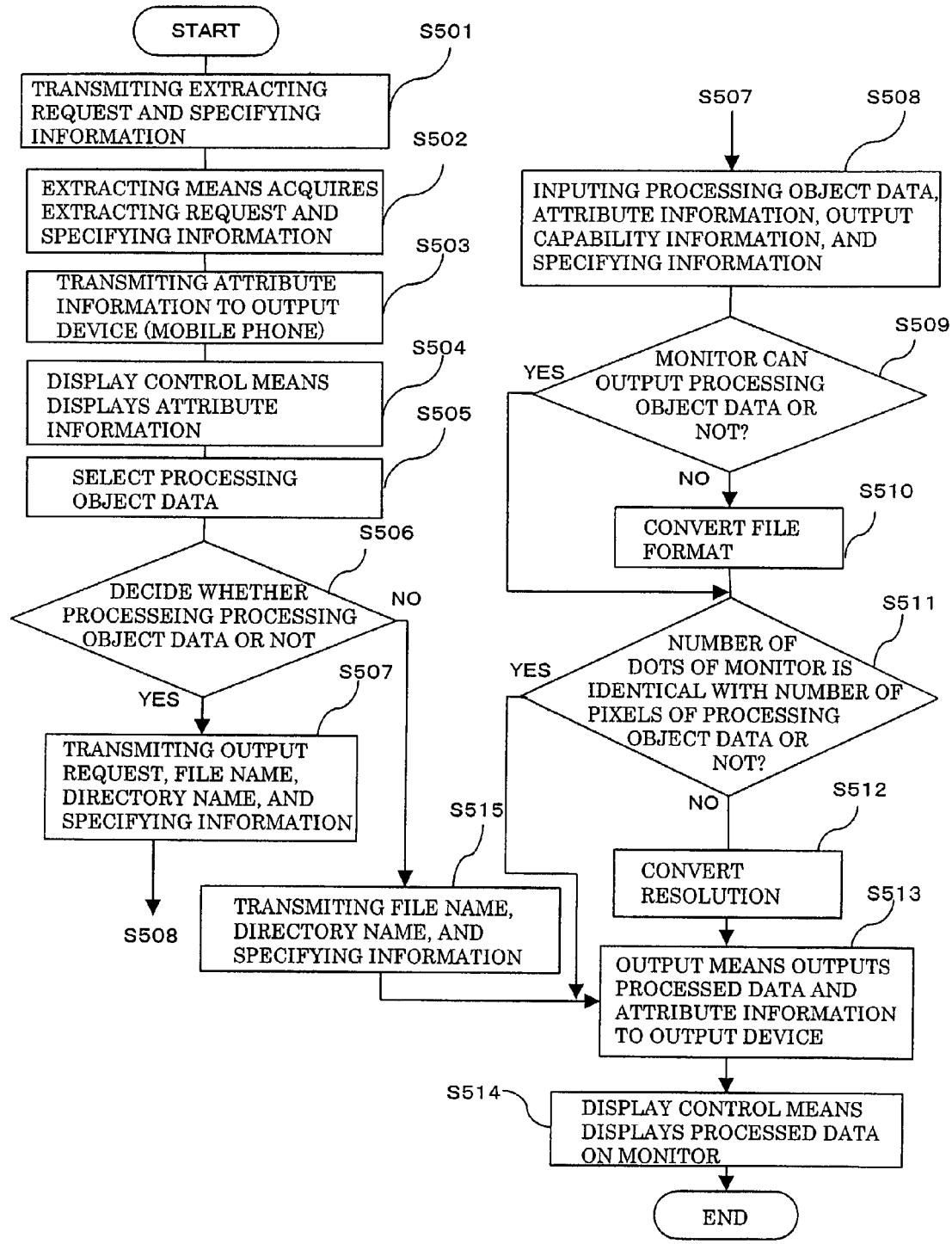
FIG. 5 is a flowchart showing the sequence of the processing.

The extracting request and specifying the information 201 of the mobile phone 120A transmitted from the communication control means 123 are acquired by the extracting means 104 through the communication control means 109 of the data processing control apparatus 100 (FIG. 5, S502). At receiving the extracting request and the specifying information 201, the extracting means 104 acquires all the attribute information 211 stored in the storage means 101, and then transmits the attribute information 211 to the mobile phone 120A through the communication control means 109 (FIG. 5, S503).

The attribute information 211 transmitted from the extracting mans 104 is acquired by the display control means 124 through the communication control means 123. At receiving the attribute information 211, the display control means 124 displays the attribute information 211 on the monitor 121 as shown in FIG. 6(a) (FIG. 5, S504). Besides, since the purpose of the displaying is to let the user know contents of the processing object data 212, the display control means 124 displays only the file name, the number of pixels, the data size, and the file format of the attribute information 211.

Referring to the monitor 121, the user selects the record (the file name, the number of pixels, the data size, and the file format) of the processing object data 212 to be the wallpaper by means of the cursor of the mobile phone 120A, as shown in FIG. 6(b) (FIG. 5, S505).

When the record of processing object data 212 is selected, the display control means 124 displays the attribute information 211 of the processing object data 212 corresponding to the selected record and the output capability information 202 (the number of dots) of the monitor 121, as shown in FIG. 6(c). Additionally, the display control means 124 displays on the monitor 121 an alternative ("YES" or "NO") in order to make the user decide if the processing object data 212 is converted to the format adapted for the display capability of the monitor 121. At this time, the user is assumed to select "YES" shown in FIG. 6(c) by means of the cursor of the mobile phone 120A (FIG. 5, S506)

When "YES" is selected, the communication control means 123 transmits to the data processing control apparatus 100 the output request to output the selected processing object data, the file name and directory name of the processing object data 212 and the specifying information 201 of the mobile phone 120B (FIG. 5, S507).

At receiving the output request, the file name and the directory name through the communication control means 109, the extracting means 104 of the data processing control apparatus 100 acquires the processing object data 212 and attribute information 211 corresponding to the received file name and directory name from the storage means 101, and then inputs the processing object data 212 and the attribute information 211 to processing means 105. And the extracting means 104 acquires the output capability information 202 corresponding to the received specifying information 201 from the storage means 101, and then the output capability information 202 and the specifying information 201 into the processing means 105 (FIG. 5, S508).

The processing means 105 compares the file format of the attribute information 211 inputted from the extracting means 104 and the file format of the output capability information 202 of the mobile phone 120B, and then decides whether the monitor 121 of the mobile phone 120B can display the processing object data 212 without converting the file format (FIG. 5, S509).

When deciding that the data cannot be displayed, the processing means 105 convert the file format of the inputted processing object data 212 to the specific file format included in the output capability information 202, and then starts the next step (FIG. 5, S510). In addition, if deciding that the data can be displayed, the processing means 105 starts the next step without converting the file format.

Next, the processing means 105 compares the number of dots of the output capability information 202 and the number of pixels of the attribute information 211, and if the number of dots is different from the number of pixels, the resolution of the processing object 212 data is converted (FIG. 5, S511 to S512). For instance, in case where the number of dots of the output capability information 202 (the number of dots on the monitor 121 of the mobile phone 120B) is 120 (width)× 160 (length) and the number of pixels of the attribute information 211 (the processing object data 212) is 240 (width)×320 (length), the processing means 105 converts the resolution so as to uniform the pixel number of the processing object data 212 to the number of dots on the monitor 121 (so that the number of pixels of the processing object data 212 should be ¼). Besides, the processing means 105 changes the file format and number of pixels of the attribute information 211 according to the file format and resolution conversion of the processing object data 212.

After the resolution conversion, the processing means 105 transmits to output means 106 the processing object data 212 after the processing (which is called "processed data 312" hereinafter), the attribute information 311 of the processed data 312 and the specifying information 201. After receiving the processed data 312 and the attribute information 311 and the specifying information 201, the output means 106 outputs the processed data 312 and the attribute information 311 to the mobile phone 120B specified by the specifying information 201 through the communication control means 109 (FIG. 5, S513).

The processed data 312 and attribute information 311, which are outputted from the output means 106, are inputted to the communication control means 123. At acquiring the processed data 312 and attribute information 311, the communication control means 123 displays on the monitor 121 the processed data 312 based on the attribute information 311, and stores them in the storage means 122 (FIG. 5, S514).

As described above, the user of the mobile phone 120A can display on the monitor 121 of the mobile phone 120B the whole image data of which the original number of pixels is larger than the number of dots on the monitor 121, only by transmitting the output request and the extracting request. And converting the file format of the processing object data 212 allows the monitor 121 to display the processing object data 212, even if the monitor of the mobile phone 120B is not provided with the display function adapted for the file format of the processing object data 212 before the processing. In addition, the processing such as the resolution conversion of the processing object data 212 is executed by the data processing control apparatus 100 and the output device 120A has nothing to do with the conversion of the processing object data 212, so that CPU of the mobile phone 120A is not occupied by the conversion processing.

Besides, when the user of the mobile phone 120A selects "NO" shown in FIG. 6, the communication control means 123 does not transmit the output request to the data processing control apparatus 100 but transmits only the file name and directory name of the processing object data 212 and the specifying information 201 of the mobile phone 120B to the data processing control apparatus 100 (FIG. 5, S515). In case of receiving only the file name, the directory name and the specifying information 201 of the mobile phone 120B instead of the output request, the extracting means 104 acquires from the storage means 101 the processing object data 212 and the attribute information 211 corresponding to the file name and directory name. The extracting means 104 does not input the received specifying information 201, the acquired processing object data 212 and attribute information 211 into the processing means 105, but inputs them to the output means 106. The output means 106 outputs the inputted processing object data 212 and attribute information 211 to the mobile phone 120B specified by the specifying information 201 through the communication control means 109 (FIG. 5, S513).

The resolution conversion executed by the processing means 105 may be arranged that the conversion rate of resolution in the longitudinal direction be different from that in the horizontal direction. For instance, where the number of dots on the monitor 121 is 120 (widthwise)×143 (length) and the number of pixels of the processing object data 212 is 360 (width)×286 (length), the processing means 105 may convert the number of widthwise pixels to ⅓ and the number of lengthwise pixels to ½ of the processing object data 212.

Moreover, the above discuses about a case where the storage means 101 stored the processing object data 212 and the attribute information 211, and the specifying information 201 and output capability information 202 of the mobile phone 120B in advance, however, if the specifying information 201 and the output capability information 202 were not stored in advance, the extracting means 104 cannot acquire from the storage means 101 the output capability information 202 corresponding to the specifying information 201 transmitted from the mobile phone 120A. In case where the output capability information 202 cannot be acquired from the storage means 101, the extracting means 104 inquires of the mobile phone 120B about the output capability information 202 through the communication control means 109.

When the output capability information 202 is transmitted from the mobile phone 120B in response to the inquiry, the extracting means 104 inputs the received output capability information 202 and the specifying attribute information 211 to the processing means 105. In this case, the storage mans 101 becomes the providing means 112 of the processing object data 212 and the attribute information 211, and the communication control means 109 becomes the providing means of the output capability information 202. Besides, the extracting means 104 may register in the storage means 101 the transmitted output capability information 202 and the specifying information 201.

In addition, if the storage means 101 as the providing means 112 is not provided to the data processing control apparatus 100, the communication control means 109 becomes the providing means of the processing object data 212, the attribute information 211 and the output device information 200 of the mobile phone 120B.

For instance, it is assumed that the storage means 122 of the mobile phone 120A stores a raw image data (processing object data 212) acquired from the Website. At this time, if the user of the mobile phone 120A selects "1. Output request of processing object data" shown in FIG. 3(b), the display control means 124 displays on the monitor 121 a list of attribute information 211 of the processing object data 212 stored in the storage means 122, as shown in FIG. 6(a). The user selects a record of the processing object data 212 from the displayed attribute information 211, said data he wants as wallpaper. When the record is selected, the communication control means 123 acquires from the storage means 122 the selected processing object data 212 and the attribute information 211, and then transmits to the data processing control apparatus 100 the processing object data 212, the attribute information 211, the output request, and the output device information 200 of the mobile phone 120B.

At receiving the processing object data 212, the attribute information 211, the output request and the output capability information 200, the extracting means 104 registers them to the storage means 101. Besides, the processing object data 212 is to be registered to the storage means 101 in this step, however it does not necessarily have to be registered.

The above extracting means 104 inputs to the processing means 105 the received processing object data 212, the attribute information 211 and the output capability information 200. Thereby, as described above, the processing object data 212 and the attribute information 211 are converted to the specific file format or the specific resolution based on the processing object data 212, the attribute information 211 and the output capability information 200 that are transmitted from the mobile phone 120B and then inputted to the mobile phone 120B (FIG. 5, S508 to S514).

Figure 7:
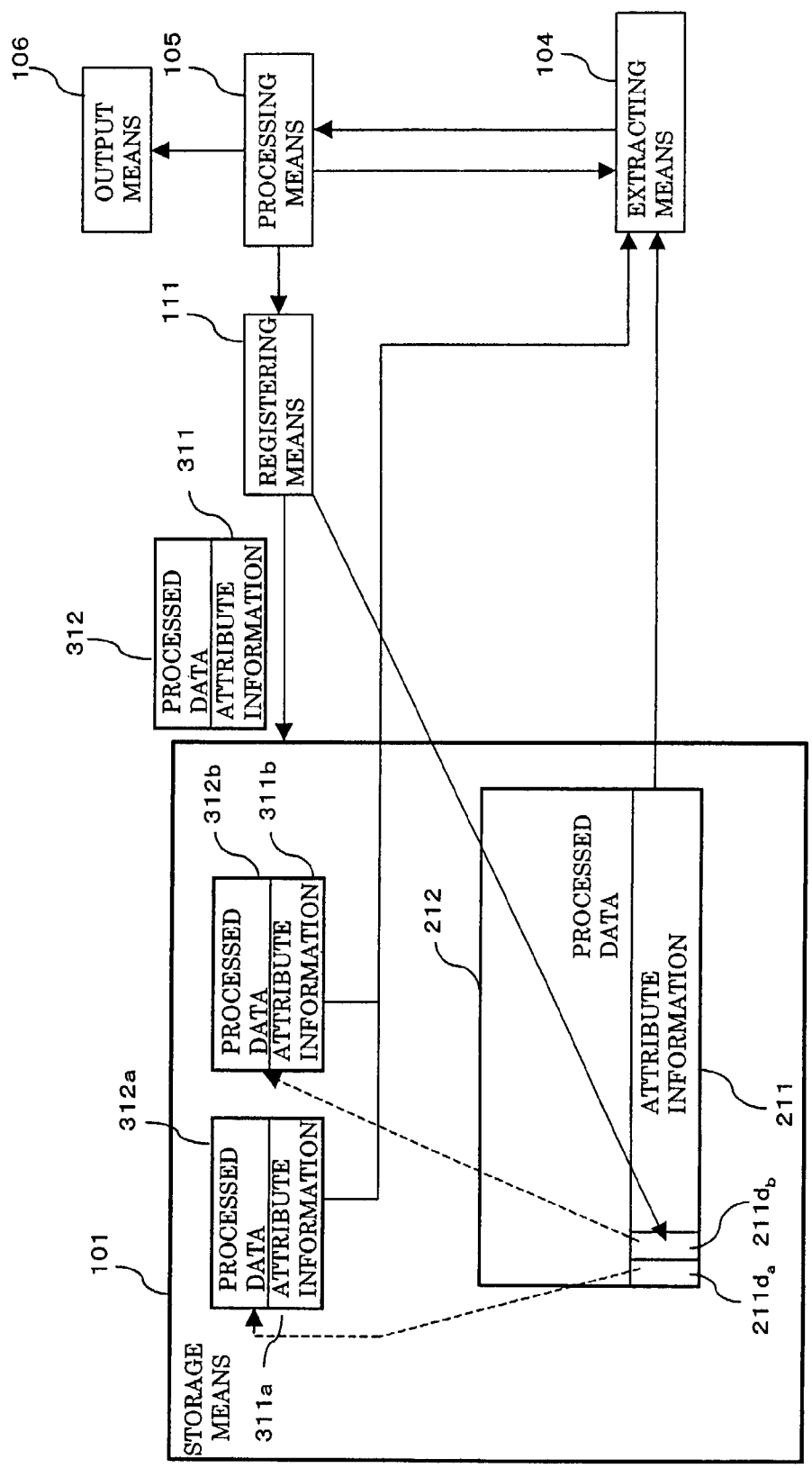
FIG. 7 is a conceptual diagram showing that the processing history information is described in the attribute information of the processing object data.

In the meanwhile, in order to reduce the processing time of the processing object data 212, it is preferable that the processed data 312 generated by the processing means 105 is stored in a specific directory of the storage means 101 by registering means 111 and correlated with the attribute information 311, as shown in FIG. 7.

That is to say, the processed data 312 generated at the processing of a specific processing object data 212 is to be stored in the specific directory of the storage means 101 as described hereinafter. At this time, the attribute information 211 of the specific processing object data 212 may be included in history information 211d (211$d_a$ and 211$d_b$ in FIG. 7) representing that the processed data 312 exists on the storage means 101 as shown in FIG. 7. For example, the history information 211d is composed of produce directory names of the processed data 312a and 312b on the storage means 101.(the directory name is also described in the field illustrated the attribute information 211).

Besides, when output requests for the same processing object data 212 are transmitted from plural types of mobile phone 120A having different output capabilities, the corresponding number of history information 211d should be included in the attribute information 211 of the processing object data 212.

Under such arrangement, at receiving the output request, the file name, the directory name and the specifying information 201 as above, the extracting means 104 acquires from the storage means 101 the processing object data 212, the attribute information 211 and the output capability information 202. Next, the extracting means 104 judges whether the acquired attribute information 211 contains the history information 211d or not (FIG. 5, S508 to FIG. 8, S801).

Figure 8:
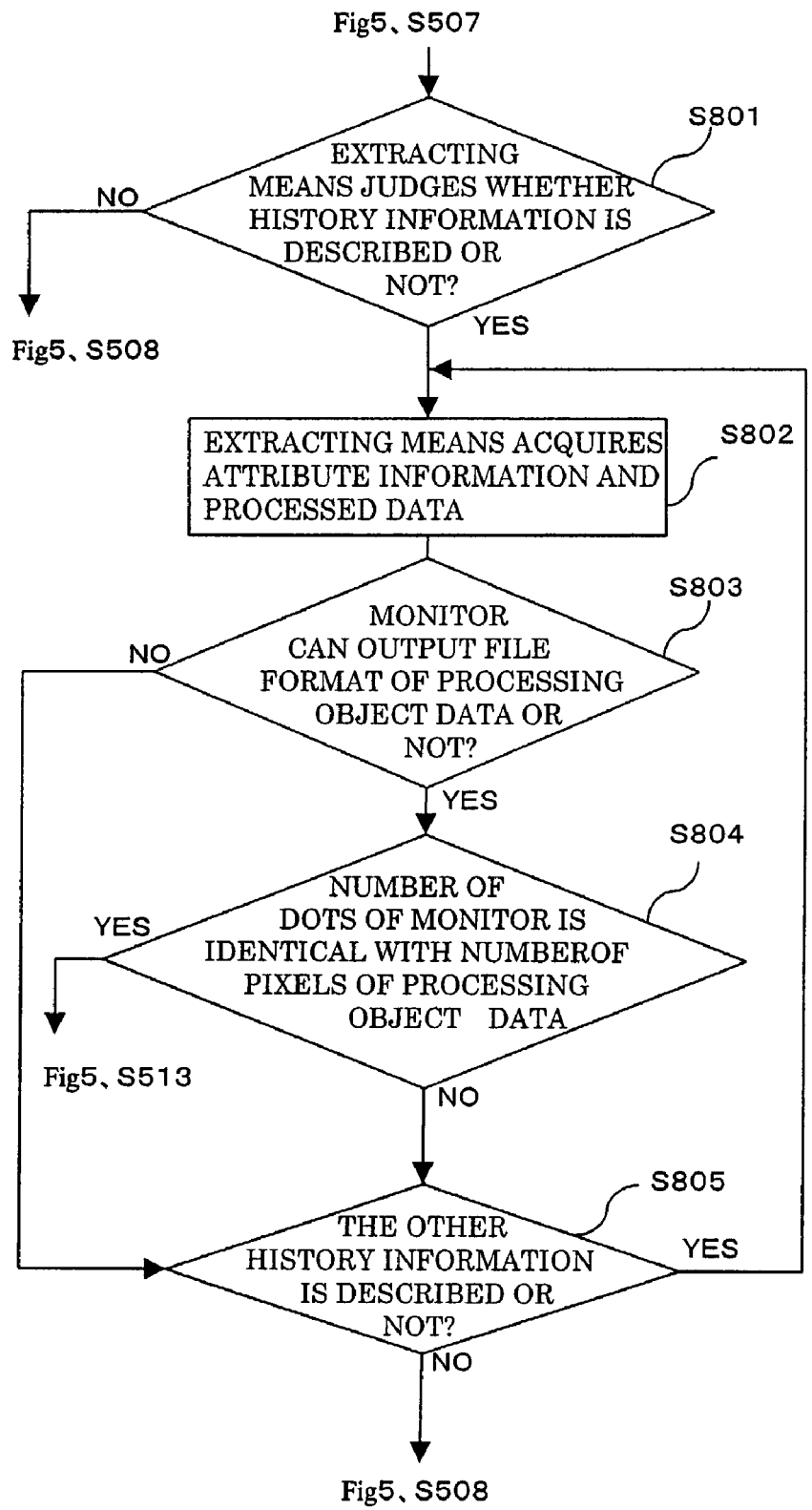
FIG. 8 is a flowchart showing the sequence of processing.

When deciding in the judgment step that the attribute information 211 contains the history information 211d, the extracting means 104 acquires the attribute information 311a of the processed data 312a from the directory specified by the history information 211d (the first history information 211$d_a$ if there are a plurality of history information) (FIG. 8, S802). And then, the extracting means 104 inputs the acquired processed data 312a, attribute information 311a and output capability information 202 to the processing means 105.

The processing means 105 judges whether the inputted attribute information 311a includes the same file format as the output capability information 202 of the mobile phone 120B, and whether the number of pixels of the attribute information 311a is the same as the number of the dots of the output capability information 202 of the mobile phone 120B (FIG. 8, S803 to S804).

At this time, when the both above judgments are affirmative, the processing means 105 transfers to the output means 106 the attribute information 311a, the processed data 312a corresponding to the attribute information 311a together with the specifying information 201. The output means 106 transmits the processed data 312a and the attribute information 311a to the mobile phone 120B through the communication control means 106 (FIG. 5, S513).

When each judgment of the processing means 105 is negative, the processing means 105 notifies the extracting means 104 that the negative response is received. At receiving the notification, the extracting means 104 acquires the processed data 312b and the attribute information 311b based on a next history information 211$d_b$, and then inputs them to the processing means 105 (FIG. 8, S805, YES to S802).

When the notification of the negative response is received, if the next history information 211$d_b$ is not included in the attribute information 211 of the processing object information 212, the extracting means 104 inputs to the processing means 105 the processing object data 212 and the attribute information 211. At the input of the processing object data 212 and the attribute information 211, the processing means 105 processes the processing object data 212 as described above (FIG. 8, S805, NO to FIG. 5, S508). Besides, even when the extracting means 104 acquires the negative response at the step of judging whether the history information 211d is included in or not (FIG. 8, S508), the processing object data 212 is processed by the processing means 105 as mentioned above (FIG. 8, S801, NO to FIG. 5, S508).

According to the above steps of changing to the steps shown in FIG. 5 instead of extracting the processed data 312 shown in FIG. 8, it is possible to first generate the processed data 312 corresponding to the output device 120 with the same display capability as the output device 120 transmitting the output request. And the processing means 105 transmits the generated processed data 312 and the attribute information 311 to the output device 120B by transferring to the output means 106, and transfers them to the registering means 111 simultaneously. The registering means 111 stores in the storage means 101 the processed data 312 and the attribute information 311 with correlating mutually, and the directory name of the processed data 312 is written into the attribute information field of the processing object data 212 as the history information 211d.

Thereby, when the output request is transmitted from the output device 120B having the same output capability as the mobile phone 120B, the extracting means 104 and the processing means 105 are activated as shown in FIG. 8.

By means of the processed data 312 prepared in advance as above, it is possible to shorten the processing time for the processing object data 212.

Besides, it may be arranged so as to utilize as the history information 211d the specifying information 201 of the output device 120B transmitting the output request without using the attribute information 211. In this case, if referring to the specifying information 201, the processing means 105 can know the processed data 312 corresponds to the processing object data 212 converted for eany output device. That is to say, where the specifying information 201 of the history information 211d is identical with the specifying information 201 transmitted with the output request, there is a processed data 312 to which a specific processing object data 212 is converted for the output device transmitting the output request. If identical, the processing means 105 outputs the processed data 312 stored in the storage means 101 to the output means 106. If not identical, the processing step moves to the step 508, and the processing object data 212 is processed by the processing means 105.

Embodiment 2

In the above description, the processing means 105 converts the resolution to uniform the number of pixels of processing object data 212 into the number of dots on the monitor 121. However, where the number of pixels of the processing object data 212 is 140 (width)×200 (length) and the number of dots on the monitor 121 of the mobile phone 120B is 120 (width)×160 (length), the processing means 105 may delete 10 pixels from the left and right ends and 20 pixels from the top and lower ends of the processing object data 212 to uniform the number of pixels of the processing object data 212 into the number of dots on the monitor 121.

Besides, the processing means 105 also may delete the same number of pixels from the top and lower ends or from the left and right ends, otherwise, may delete the lower side pixels or the left side pixels of the processing object data 212 with first priority, or may delete 5 pixels of the top end, 35 pixels of the lower end, 15 pixels of the left end, and 5 pixels of the right end respectively, for example.

The information of the pixels to be thus deleted by the processing means 105 may be set as a program in the processing means 105 by the user of the data processing control apparatus 100 in advance. But, it is needless to say that, in case of deleting the predetermined pixels, the pixels (a specific image area) desired by the user of the mobile phone 120B is not always deleted.

Therefore, the processing means 105 stores in buffer 110 the processing object data 212 and the attribute information 211 before the pixels are deleted. Next, the processing mans 105 deletes the specific pixels of the processing object data 212 acquired from the extracting means 104. There is no doubt that the processing means 105 changes the attribute information 211 with deleting the pixels.

And then, the processing means 105 transmits to the mobile phone 120B the processed data 312 in which the specific pixels are deleted, the attribute information 311, the deletion information indicating the deleted pixels, a confirmation request of the deleted area by means of the specifying information 201 through the output mean s106 and the communication control means 109.

At receiving the processed data 312, the attribute information 311, the deletion information, and the confirmation request that are transmitted from the output means 106, the communication control mans 123 of the mobile phone 120B transfers to the display control means 124 the processed data 312, the attribute information 311, the deletion information, and the confirmation request thus acquired. The display control means 124 displays the processed data 312 and the confirmation "Will this image do?" on the monitor 121 by mean of the attribute information 311.

At this time, when the user selects "YES" by a specific key of the mobile phone 120B, the display control means 124 stores the processed data 312 and the attribute information 311 in the storage means 122. Additionally, when the user selects "YES" as described above, the communication control means 123 transmits to the data processing control apparatus 100 the processing object data 212 and the attribute information 201 stored in the buffer 110 and the signal directing to delete the stored processing object data 212 and the attribute information 201. The signal is received by the processing means 105 through the communication control means 109, and the processing means 105 deletes the processing object data 212 and the attribute information 211 from the buffer 110.

On the other hand, if the user selects "NO" by means of the specific key of the mobile phone 120B, the display control means 124 displays on the monitor 121 the deletion information of the processed data 312 as shown in FIG. 9(b). Thereby, the user inputs the number of pixels to be deleted from the top, lower, left and right ends of the processed data 312 to respective input spaces of displaying the deletion information by means of the cursor or ten-key of the mobile phone 120B.

The inputted values are transmitted to the data processing control apparatus 100 by the communication control device 123, and acquired by the processing means 105 of the data processing control apparatus 100. The processing means 105 acquires the processing object data 212 and the attribute information 211 stored in the buffer 110, and then deletes a specific number of pixels from the acquired processing object data 212 based on the values inputted by the user.

After deleting the specific number of pixels, the processing means 105 outputs to the output means 106 the processed data 312 from which the specific number of pixels is deleted, the attribute information 311 and the specifying information 201. Needless to say that the processing means 105 also changes the attribute information 311 with deleting the pixels.

At receiving the processed data 312 and the attribute information 311, the output means 106 transmits to the mobile phone 120B the processed data 312 and the attribute information 311 through the communication control means 109. The communication control means 123 acquires the processed data 312 and the attribute information 311, and then transfers the acquired processed data 312 and the attribute information 311 to the display control means 124. The display control means 124 displays the processed data 312 on the monitor 121 based on the transferred attribute information 311, and stores the processed data 312 and the attribute information 311 in the storage means 122.

Embodiment 3

In FIG. 7 and FIG. 8, the directory name of the processed data 312 and the attribute information 311 is described as the history information 211d in the field in which the attribute information 211 of the processing object data 212 should be described. Instead of this arrangement, the history information 211d may be stored in the storage means 122 of the mobile phone 120B.

In this case, too, the registering means 111 stores the processed data 312 and the attribute information 311 transferred from the processing means 105 in a specific directory of the storage means 101 like Embodiment 1.

After storing the processed data 312 and the attribute information 311 in the storage means 101, the registering means 111 transfers the directory name storing the processed data 312 to the output means 106.

The output means 106 includes the directory name transferred from the writing means 111 in the attribute information 311 (the number of dots, and etc.) transferred from the processing mans 105 as the history information 211d in the same way as described in Embodiment 1. After including the directory name in the attribute information 311, the output means 106 outputs the attribute information 311 and the processed data 312 to the mobile phone 120B specified by the specifying information 201 transferred from the processing means 105 through the communication control means 109.

After being received by the communication control means 123 of the mobile phone 120B, the processed data 312 and attribute information 311 outputted from the outputting means 106 are correlated with each other and then stored in the storage means 122

Meanwhile, it is general that the memory size of the storage means 122 of the mobile phone 120B is small, and for this reason there are occasions when the user deletes from the storage means 122 the processed data 312 no longer required. However, after that, there is an occasion when the user wants to display the deleted processed data 312 on the monitor 121 of the mobile phone 120B. In this case, the processing object data 212 (the processed data 312) processed according to the output capability of the monitor 121 has been stored in the storage means 101 of the data processing control apparatus 100, so that the user may operate the following works in order to acquire the processed data 312 from the data processing control apparatus 100.

Figure 10B:
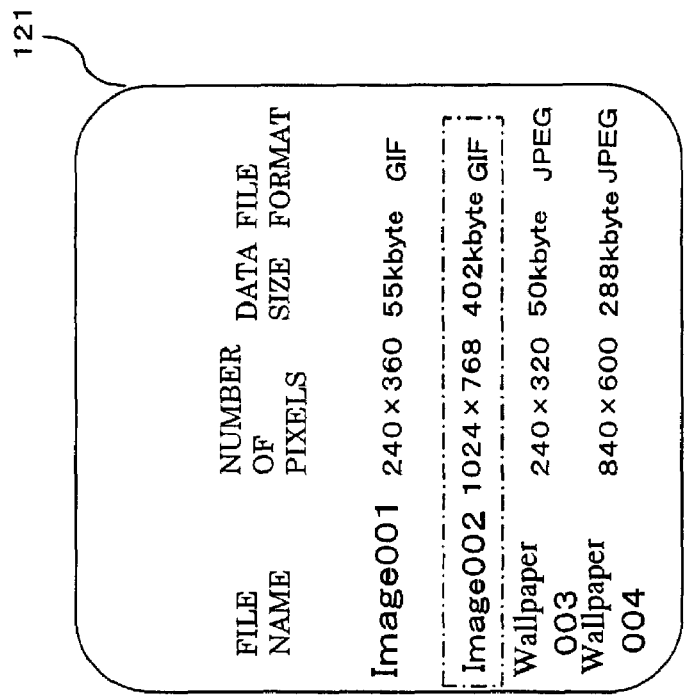
FIG. 10A and FIG. 10B are diagrams showing the initial screens of the monitors.
Figure 10A:
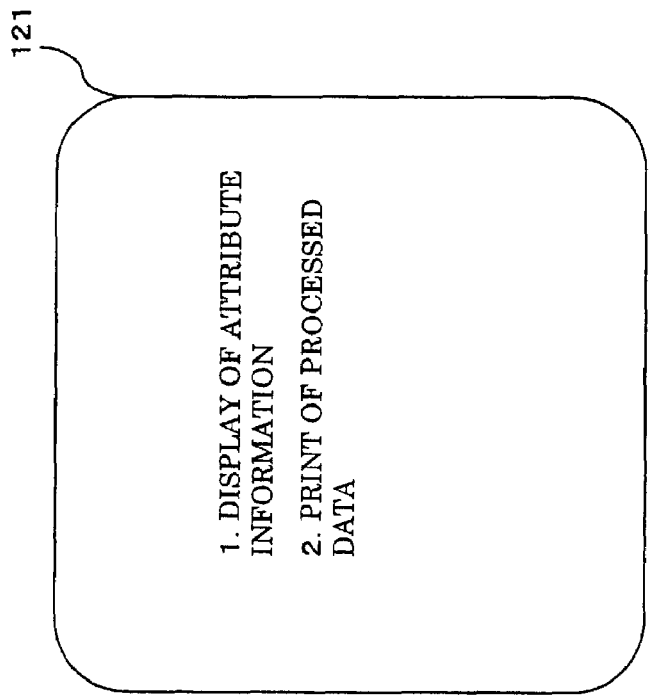

First, the user presses a menu key of the mobile phone 120A, and displays on the display control means 124 the menu as shown in FIG. 10(a). Next, the user selects "1. Display of attribute information" shown in FIG. 10(a) by the specific cursor of the mobile phone 120. When "1. Display of attribute information" is selected, the display control means 124 displays on the monitor 121 a list of attribute information 311 including the directory name as the history information 211d as shown in FIG. 10(b). The user selects the specific attribute information 311 from the attribute information 311 displayed on the monitor 121 as shown in FIG. 10(b) by the cursor key of the mobile phone 120A.

At this time, even when the storage means 122 also stores the attribute information 211 of the raw data of the processing object data 212 acquired from the Website, if the attribute information 311 including the directory name is stored in the storage means 122, the display control means 124 can display only the attribute information 311 including the directory name on the monitor 121. Thereby, the user can find the attribute information 311 of the processed data 312 with ease.

When the specific attribute information 311 was selected by the user, the communication control means 123 acquires the directory name of the selected attribute information 311 from the storage means 122 and then transmits the acquired directory name, the file name of the selected attribute information 311, and the acquisition request of the processed data 312 toward the data processing control apparatus 100.

The extracting means 104 of the data processing control apparatus 100 receives the acquisition request and so on through the communication control means 109, and then acquires from the storage means 101 the processed data 312 corresponding to the directory name and file name received with the acquisition request. Therefore, the extracting means 104 does not need to refer to the history information 211d included in the attribute information 211 of the processing object data 212 in order to extract the processed data 312 as described in Embodiment 1.

The extracting mans 104 transfers the specifying information 201 and the acquired processed data 312 to the output means 106, and the output means 106 transmits the processed data 312 to the mobile phone 120B through the communication control means 109.

Besides, the mobile phone 120B is provided with the function of displaying the list of the attribute information 311 on the monitor 121 as shown in FIG. 10(b), and hereby the user can confirm the processing object data 212 processed for the mobile phone 120B at any time.

Embodiment 4

It is assumed in this embodiment that the user of the mobile phone 120A confirm the processed data 312 outputted from the output means 106 on the monitor 121 as described in Embodiment 1 and then instructs to print the processed data.

On the other hand, the business office is equipped with a various types of printing devices, in which case, if it is arranged that the processed data 312 be able to be printed out by a printing device that the user selects from the various types of them, it is possible to assure the specific printing quality.

From the above mentioned aspects, it is arranged that the specifying information of respective printing devices and the printing capability that is the information about the printing performance of each printing device be stored in the storage means 101 of the data processing control apparatus 100 in advance. The specifying information and printing capability information of printing device can be stored in the storage means 101 in the same way of the registration of the specifying information 201 and output capability information 202 of the output device 120B.

Additionally, the specifying information of the printing device is the information for specifying the printing device, and, for example, it is composed of the product name, the serial number, IP address, MAC address, and so on. The printing capability information is composed of the resolution of the printing device, and the file format that the printing device can print out, and so on. Besides, the printing device may be a device different from the data processing control apparatus 100 (for example, a printer connected with the data processing control apparatus 100 via LAN) or a printer provided with the data processing control apparatus 100.

Under the conditions that the above-described information is stored in the storage means 101, the user of the mobile phone 120A must operate the following steps in order to print the processed data 312 by the desired printing device. Besides, in this embodiment and Embodiment 5, the mobile phone works as the output request device 120A, and the printing device works as the output device 120B.

When the processed data 312 is displayed on the monitor 121 by the display control means 124 like Embodiment 1, the user presses the menu key of the mobile phone 120A and displays the screen shown in FIG. 10(a) on the monitor. At the this time, it is assumed that the processed data and the attribute information 311 be also stored in the buffer 110 provided to the data processing control apparatus 100 or in the specific directory of the storage means 101 by registered means 111.

Here, the user selects "2. Print of processed data" by the cursor key of the mobile phone 120A. When "2. Print of processed data" is selected, the communication control means 123 acquires from the storage means 122 the file name and directory name included in the attribute information 311 of the processed data 312 displayed on the monitor 121 just before the menu key is pressed. The communication control means 123 transmits the acquired file name and directory name and the print request (output request) to the data processing control apparatus 100.

The file name and directory name and the print request are received by the selecting means 108 of the data processing control apparatus 100 through the communication control means 109. At receiving the file name and directory name and the print request, the selecting means 108 acquires the specifying information and the print capability information of the printing device registered in the storage means 101. The selecting means 108 transmits the acquired specifying information and print capability information to the mobile phone 120A through the communication control means 109.

The specifying information and print capability of the printing device are received by the display control means 124 through the communication control means 123 of the mobile phone 120A, and then the display control means 124 displays a list of them on the monitor 121.

When the user refers to the specifying information and the print capability information and selects from the list the printing device to print the processed data 312, the display control means 124 transmits the specifying information of the selected printing device to the selecting means 108.

The selecting means 108 acquires from the storage means 101 the processed data 312 specified by the directory name and file name transmitted together with the print request. The selecting means 108 transmits the acquired processed data 312 and the print request to the printing device specified by the transmitted specifying information, and hereby the selected printing device prints the processed data 312.

As described above, the specifying information and print capability information of the printing device are stored in the storage means 101 in advance, thereby the user can print the processed data with reference to the print capability information by the printing device selected from plural printing devices.

Embodiment 5

In case of printing the processed data 312, the selecting means 108 may compare the print capability information stored in the storage means 101 and the attribute information 311 of the processed data 312 to be printed, and then select the printing device to print the processed data 312.

In this case, the user transmits to the data processing control apparatus 100 the file name and directory name of the processed data 312 to be printed and the print request, like Embodiment 4. The selecting means 108 receives the print request as above, and then select the printing device to print the processed data 312 as follows.

First, the selecting means 108 acquires the attribute information 211 corresponding to the directory name and file name received with the print request and the specifying information and print capability information of each printing device from the storage means 101.

Here, the selecting means 108 selects the printing device to print the processed data 312 based on the number of pixels and file format of the attribute information 211 and the print capability information of the printing device. The selecting is to select the printing device that can print data in the file format of the processed data 312 or to select the printing device having high resolution if the number of pixels of the processed data 312 is larger, for example.

When the printing device is selected, the selecting means 108 transmits the processed data 312 and the print request to the printing device. The printing device prints the processed data thus transmitted.

In addition, this is the processed data 312 outputted to the monitor 121 that is printed based on the above-mentioned print request. But the resolution of the monitor 121 of the mobile phone 120A is low as compared with the TV screen, and in result the printing device prints the processed data 312 of which the picture quality is rough (the resolution is low) as compared with the processing object data 212.

Figure 11:
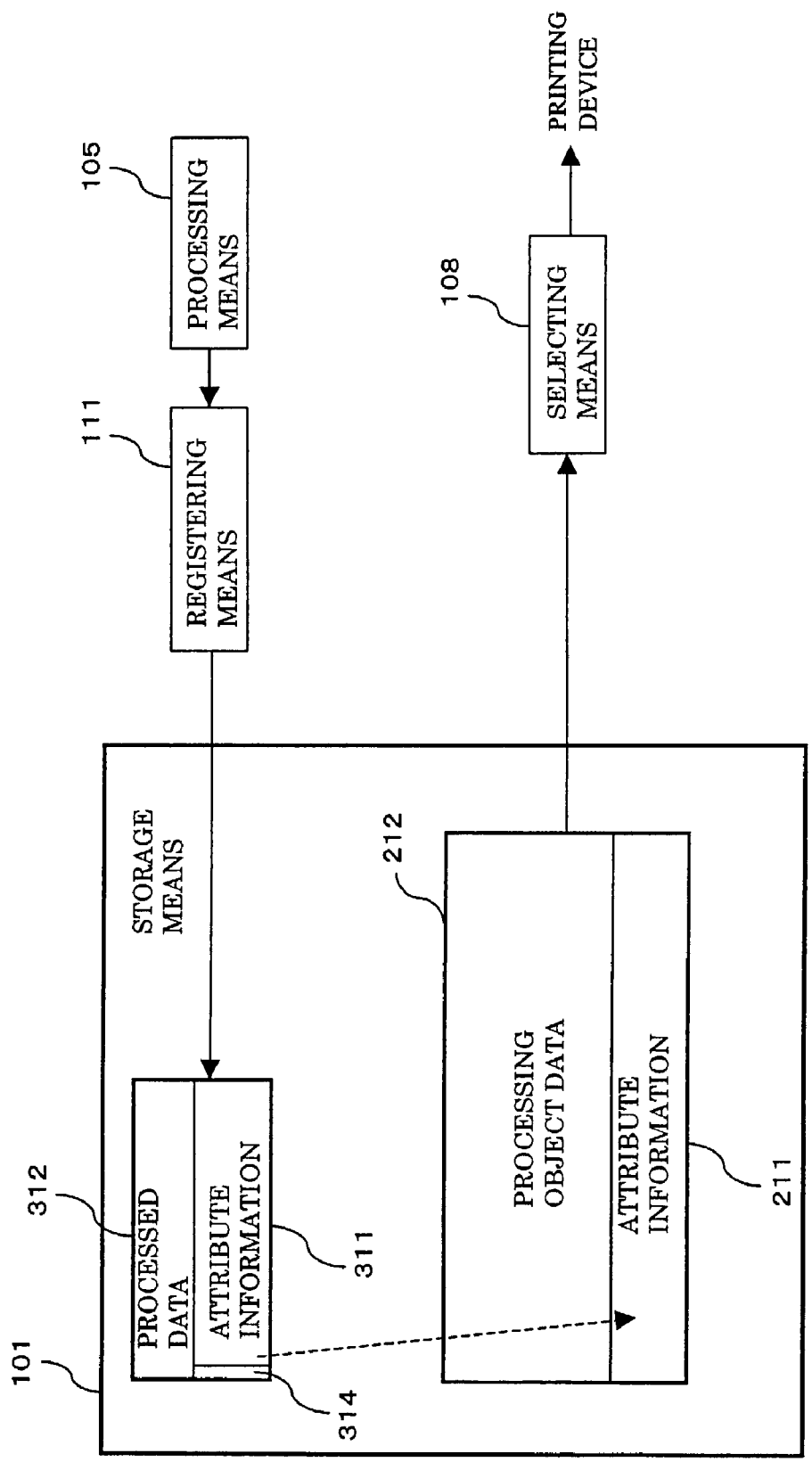
FIG. 11 is a conceptual diagram of the storage means of the data processing control apparatus.

Therefore, when the processed data 312 is stored in the storage means 101, the registering means 111 includes the directory name 314 storing the raw data of the processing object data 212 in the attribute information 311 of the processed data 312, as shown in FIG. 11.

Where the directory name 314 storing the raw data of the processing object data 212 is included in the attribute information 311 of the processed data 312, the selecting means 108 acquires the processing object data 212 and the attribute information 211 from the directory.

Thereby, the selecting means 108 selects the printing device based on the acquired attribute information 211 of the processing object data 212, specifying information and printing capability information of the printing device.

Figure 12:
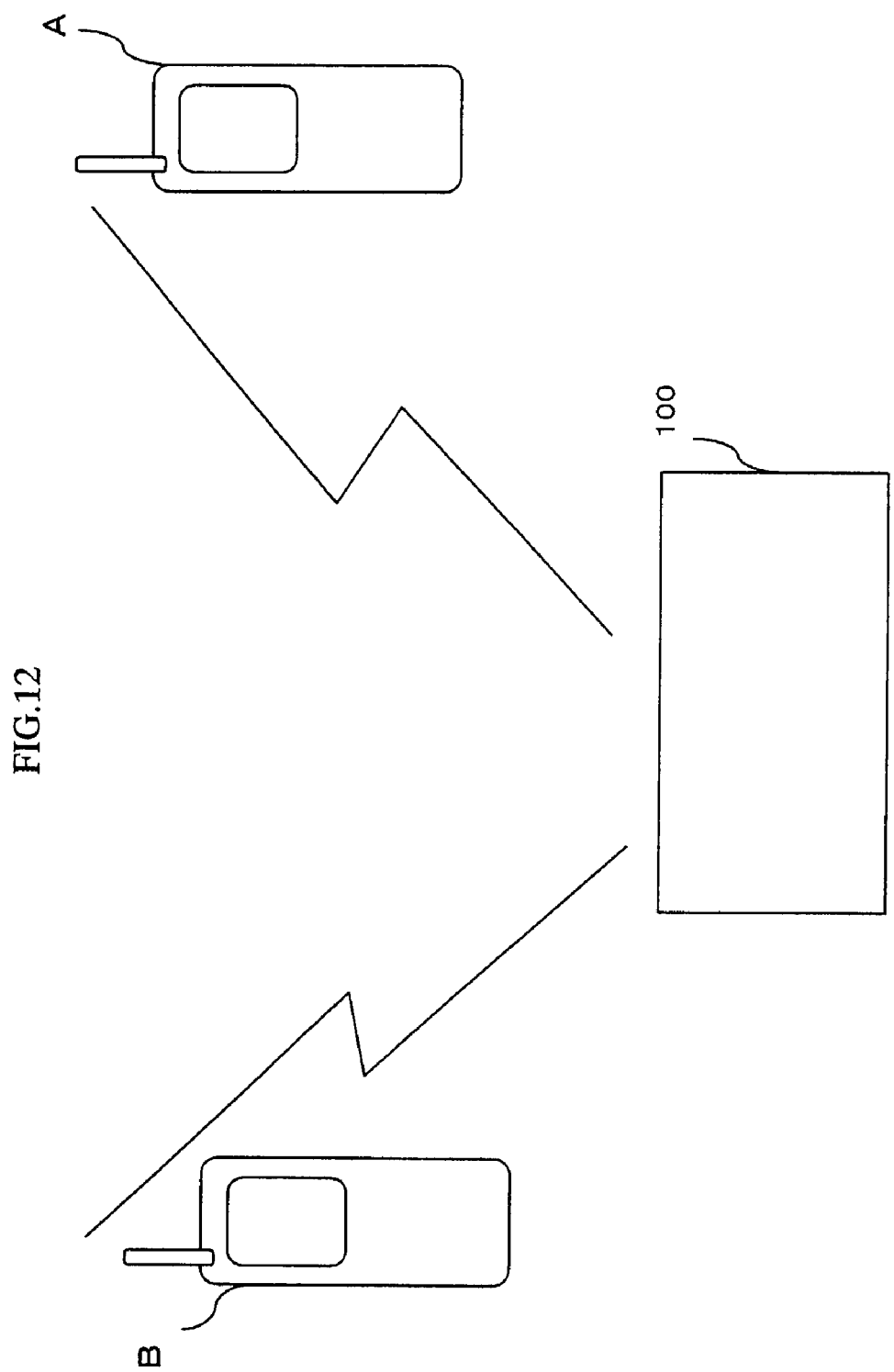
FIG. 12 is a diagram showing the situation when the communication of the processing object data is performed between different portable terminals.

The above embodiments 1 to 3 are explained on the condition that the mobile phone 120B is used as the output request device 120A and the output device 120B. However, the output request device 120A and the output device 120B are not limited to the mobile phone 120A and 120B. For instance, the output request device 120A may be the portable terminal such as a digital camera, PDA with the photographing function, or the like. In this case, as shown in FIG. 12, the user transmits to the data processing control apparatus 100 the image data photographed by the portable terminal A with the photographing function as the processing object data 212 together with the output capability information 202 of the portable terminal B to output the processed data, 312 and then the image data is processed for the portable terminal B by the data processing control apparatus 100. Thereby, it is needless to say that the photographed image data can be displayed on the portable terminal B.

Embodiment 6

As described above, since the data processing control apparatus 100 can process the processing object data 212 to the data format adapted for the output capability of the output device 120B, when a specific output request device 120A transmits the processing object data 212 to the output device 120B with a different output capability, the data processing control apparatus 100 may process the processing object data 212.

Figure 13:
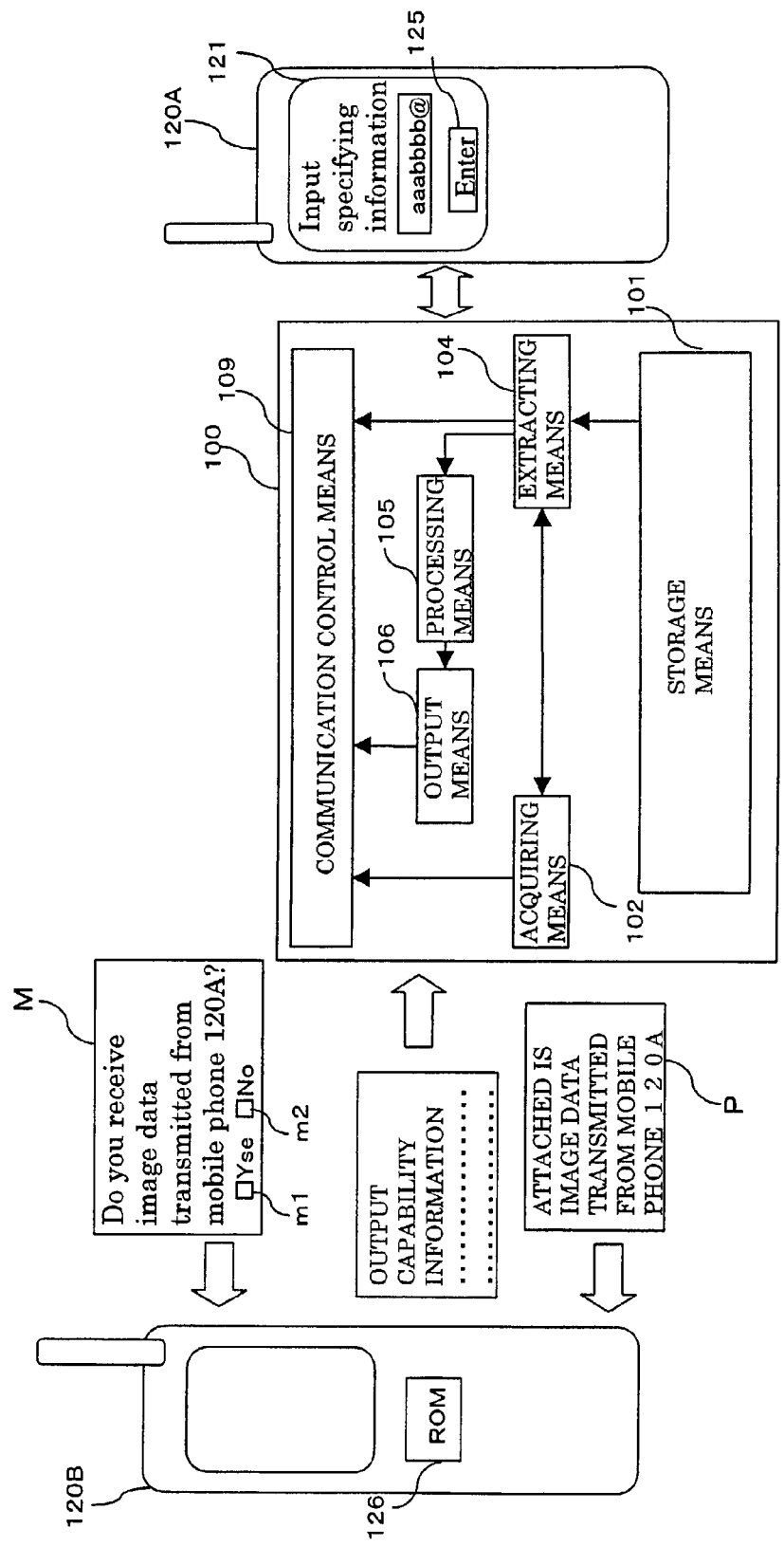
FIG. 13 is a diagram showing the situation when the communication of the processing object data is performed between different mobile phones.

For instance, it is assumed as shown in FIG. 13 that the user A transmits the image data stored in his mobile phone 120A (the output request device 120A) to the mobile phone 120B of the user B (the output device 120B).

First the user A selects "1. Data processing control apparatus", as described before, when the screen shown in FIG. 3(*a*) is displayed on the monitor 121 of the mobile phone 120A. And then, he selects "3. Transmittal request of processing object data" shown in FIG. 3(*b*). When "3. Transmittal request of processing object data" is selected, the display control means 124 display on the monitor 121 "3.1. Data of output device" and "3.2. Data of data processing control apparatus" shown in FIG. 3(*b*).

Figure 14:
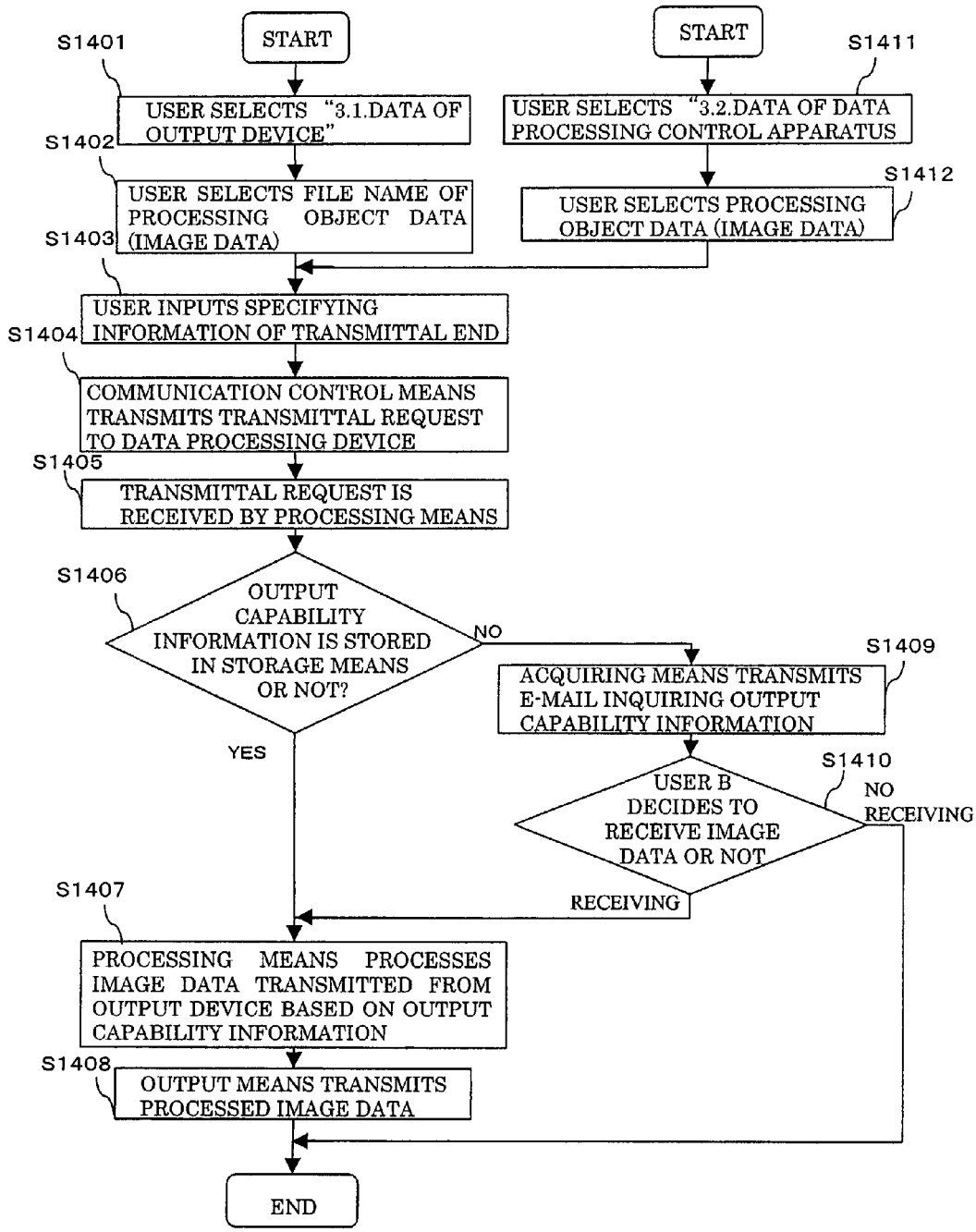
FIG. 14 is a flowchart showing the sequence of the processing.

In this case, since the image data stored in the mobile phone 120A is transmitted, the user A selects "3.1. Data of output device" (FIG. 14, S1401).

When "3.1. Data of output device" is selected, the display control means 124 displays on the monitor 121 the file name of the image data stored in the storage means 122 of the mobile phone 120A, as shown in FIG. 3(c). The user selects one from the displayed file names (FIG. 14, S1402), which is the file name of image data that he wants to transmit to the mobile phone 120B of the user B. Besides, the contents displayed by the display control means 124 is not limited to the file name, but the display control means 124 may display the number of pixels, data size, file format, and directory name of the image data in addition to the file name. Otherwise, the thumbnail image may be displayed.

When the file name is selected, the display control means 124 displays on the monitor 121 a screen for inputting specific information for specifying the mobile phone 120B of the user B, as shown in FIG. 13. Here, the user A inputs mail address of the mobile phone 120B of the user B as the specifying information (FIG. 14, S1403).

After the mail address is inputted and the enter button 125 is pressed down, the communication control means 123 acquires the image data selected by the user A and the attribute information 211 of the image data from the storage means 122. And then the communication control means 123 transmit to the data processing control apparatus 100 the transmittal request that is the output request to output image data to the other device with including the acquired image data, attribute information 211, and mail address of the mobile phone 120B (FIG. 14, S1404).

The transmittal request is received by the extracting means 104 through the communication control means 109 (FIG. 14, S1405). At receiving the transmittal request, the extracting means 104 judges whether the storage means 101 stores the output capability information 202 of the mobile phone 120B specified by the mail address of the mobile phone 120B included in the transmittal request (FIG. 14, S1406).

If deciding that the information is stored, the extracting means 104 acquires the output capability information 202 of the mobile phone 120B from the storage means 101. And the extracting means 104 inputs to the processing means 105 the image data, attribute information 211 and mail address transmitted from the mobile phone 120A, and the acquired output capability information 202. The processing means 105 processes the image data by means of the attribute information 211 of image data and the output capability information 202, like Embodiment 1 (FIG. 14, S1407).

After the processing is completed, the processing means 105 outputs the processed image data, the attribute information 311, and the mail address of the mobile phone 120B to the output means 106. When the image data, the attribute information 311, and the mail address are inputted, the output means 106 transmits E-mail attached with the image data and the attribute information 311 to the mobile phone 120B of the user 120B through the communication control means 109 (FIG. 14, S1408).

As mentioned above, the processing means 105 converts the image data transmitted from the mobile phone 120A of the user A to the format in which the monitor 121 of the mobile phone 120B of the user B can display. Therefore, even if the image data is the one that the monitor 121 of the mobile phone 120B cannot display by nature, such data is processed by the processing means 105 so that the data can be displayed on the monitor 121 of the mobile phone 120B.

If it is decided that the output capability information 202 of the mobile phone 120B is not stored in the storage means 101 in the above judgment step 1506, the extracting means 104 transfers to the acquiring means 102 the mail address of the mobile phone 120B and the acquisition request of the output capability information 202. At receiving the mail address and the acquisition request, the acquiring means 102 transmits to the mobile phone 120B through the communication control means 109 an inquiry E-mail M of inquiring whether the mobile phone 120B receives the image data transmitted from the mobile phone 120A or not (FIG. 14, S1409).

At receiving the inquiry E-mail M, the user B of the mobile phone 120B decides whether the mobile phone 120B receives the image data transmitted from the mobile phone 120A or not, and then check either one box of the radio button m1 or m2 of "YES" or "NO" (FIG. 14, S1410).

When the user B checks the radio button m1, "YES", the application attached to the inquiry E-mail M acquires the output capability information 202 of the mobile phone 120B from ROM 126, and then transmits the output capability information 202 to the data processing control apparatus 100. Needless to say that the user himself may transmit to the data processing control apparatus 100 the output capability information 202 of the mobile phone 120B attaching to the E-mail.

The output capability information 202 of the mobile phone 120B transmitted by the application is received by the extracting means 104 through the communication control means 109.

At receiving the output capability information 202, the extracting means 104 inputs to the processing means 105 the image data and attribute information 211 transmitted from the mobile phone 120A, the mail address of the mobile phone 120B and the transmitted output capability information 202 (FIG. 14, S1407). The processing means 105 processes the image data as mentioned above, and then transmits to the mobile phone 120B the E-mail P attached with the processed image data 312 and the attribute information 311 (FIG. 14, S1408).

When the user B checks the radio button m2, "NO", of the inquiry E-mail M, the application attached to the inquiry E-mail M informs the acquiring means 102 that the mobile phone 120B rejected the receipt. At receiving the notice of rejection through the communication control means 109, the acquiring means 102 informs the extracting means 104 that the mobile phone 120B rejected the receipt.

In response to the rejection notice, the extracting means 104 informs the mobile phone 120A that the mobile phone 120B rejected to the receipt of the image data instead of transmitting the image data transmitted from the mobile phone 120A to the mobile phone 120B.

There are occasions when the user A wants to transmit to the user B the image data stored in the storage means 101 of the data processing control apparatus 100 instead of the data in the storage means 122 of the mobile phone 120A.

In this case, the user A selects "3. Transmittal request of processing object data" when the monitor 121 of the mobile phone 120A displays the contents shown in FIG. 3(b), and then selects "3.2. Data of data processing control apparatus" (FIG. 14, S1411).

When "3.2. Data of data processing control apparatus" is selected, the communication control means 123 transmits the extracting request and the specifying information 201 of the mobile phone 120A to the data processing control apparatus 100, like Embodiment 1. The extracting request and the specifying information 201 of the mobile phone 120A are received by the extracting means 104, and the extracting means 104 transmits to the mobile phone 120A the attribute information 211 stored in the storage means 101, like Embodiment 1.

The attribute information 211 transmitted from the extracting means 104 is received by the display control means 124 through the communication control means 123 of the mobile phone 120A, and the display control means 124 displays the received attribute information 211 on the monitor 121 as shown in FIG. 6(*a*).

The user A selects the attribute information 211 (record) of the image data that he wants to transmit to the mobile phone 120B among the attribute information 211 displayed on the monitor 121, as shown in FIG. 6(*b*) (FIG. 14, S1412). When the record is selected, the display control means 124 displays on the monitor 121 a screen for inputting the specifying information of the mobile phone 120B of the user B, as shown in FIG. 13. The user A inputs the mail address of the mobile phone 120B, and then the communication control means 123 transmits to the extracting means 104 of the data processing control apparatus 100 the attribute information 211 selected by the user A, the specifying information 201 of the mobile phone 120A and the transmittal request including the mail address (FIG. 14, S1403 to S1404).

Since the transmittal request selected here does not include the image data unlike the case where "3.1. Data of output device" the extracting means 104 at receiving the transmittal request refers to the directory name and file name of the attribute information 211 included in the transmittal request, and acquires from the storage means 101 the image data corresponding to the attribute information 211. At receiving the image data and the attribute information 211, the extracting means 104 inputs the image data, the attribute information 211 and the mail address to the processing means 105, in the same way when "3.1. Data of output device" is selected. The image data and the attribute information 211 are processed by the processing means 105 and then transmitted to the mobile phone 120B. In this way, the image data stored in the data processing control apparatus 100 is converted to the format that the other output device 120B can display on the monitor 121 by means of a specific output device 120A, and then said data is transmitted to the other output device 120B.

The data processing control apparatus 100 may be used as a business server for processing object data in order to allow plural contracting persons to use the storage means 101 by being connected with Internet, as well as said apparatus 100 stores and processes individual processing object data 212 by being provided to the home server.

Where the data processing control apparatus 100 is used for business, it is anticipated that mass processing object data 212 will be stored in the storage means 101. In this case, if a contracting person of the data processing control apparatus 100 transmits the extracting request from the mobile phone 120A to the data processing control apparatus 100, like Embodiment 1, the attribute information 212 of mass processing object data is transmitted from the data processing control apparatus 100. It is hard for the user to find the attribute information 211 of a desired processing object data 212 among the mass attribute information.

There is the attribute information 211 of the other contracting person's processing object data 212 among the attribute information transmitted from the data processing control apparatus 100. Consequently, it is arranged to transmit to the mobile phone 120A of each contracting person only the attribute information 211 of each contracting person's processing object data 212, which is allowed to reduce the amount of the attribute information 211 transmitted from the data processing control apparatus 100.

Figure 15:
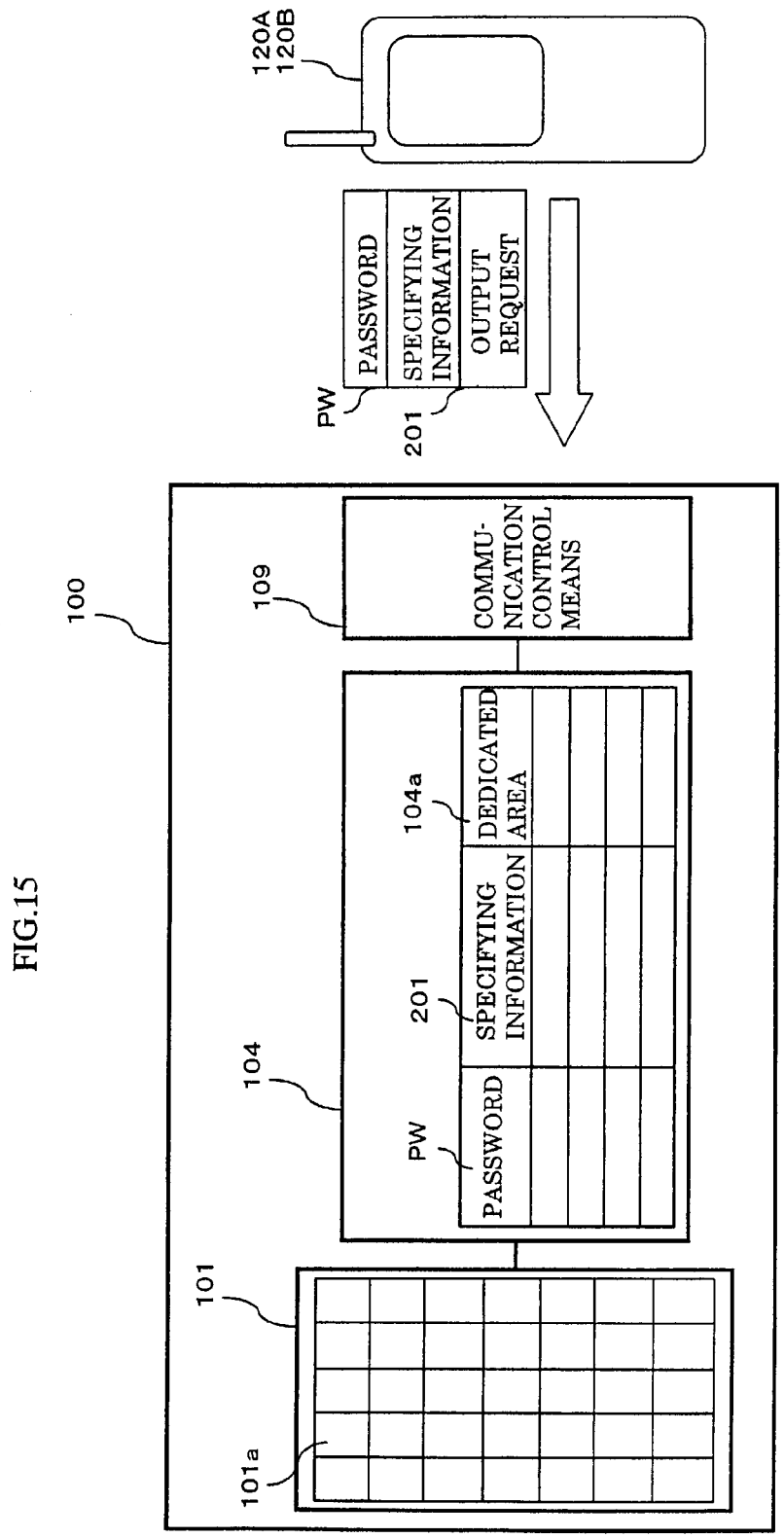
FIG. 15 is a conceptual diagram of the data processing control apparatus used as a processing object data server.

In order to establish the above arrangement, the administrator of the processing object data server rents a specific are in the storage means 101 to each contracting person as dedicated area 101 for each contracting person as shown in FIG. 15, and imparts a password PW to each contracting person so that the contracting person can access to his dedicated area 101*a*. On the other hand, the administrator of the processing object data server stores in the extracting means 104 the password PW, the specifying information 201 of the contracting person's mobile phone 120A given the password PW, access table 104*a* correlating the password PW and corresponding dedicated area 101*a*.

When each contracting person browses the attribute information 211 of his processing object data 212, for example, he inputs to the mobile phone 120A the password PW for accessing to the dedicated area 101*a* and then transmits the extracting request and the specifying information 201 from the mobile phone 120A to the data processing control apparatus 100. At receiving the password PW, the extracting request and the specifying information 201, the extracting means 104 judges whether the password PW and the specifying information are correlated each other on the access table 104*a*.

If those were correlated each other, the extracting means 104 takes out the attribute information 211 from the dedicated area 101*a* corresponding to the password PW transmitted from the mobile phone 120A and then transmits to the mobile phone 120A. Thereby, it is the only attribute information 211 of his own processing object data 212 that are transmitted to the mobile phone 120A of the contracting person If it is judged that those were not correlated, the extracting means 104 does not acquire the attribute information 211 and informs the mobile phone 120A that the attribute information 211 cannot be taken out, for example.

Embodiment 7

The acquiring mans 102 may use as the directory name to store the processing object data transmitted from the output request device 120A or the output device 120B the specifying information 201 of the output request device 120A or the output device 120B, such information transmitted together with the processing object data 212.

If the specifying information 201 is used as the directory name, even when plural mobile phones 120A and 120B (plural persons) transmit the processing object data 212 with same file name, each of data is registered in different directories. Therefore, the extracting means 104 can distinguish those files.

Figure 16:
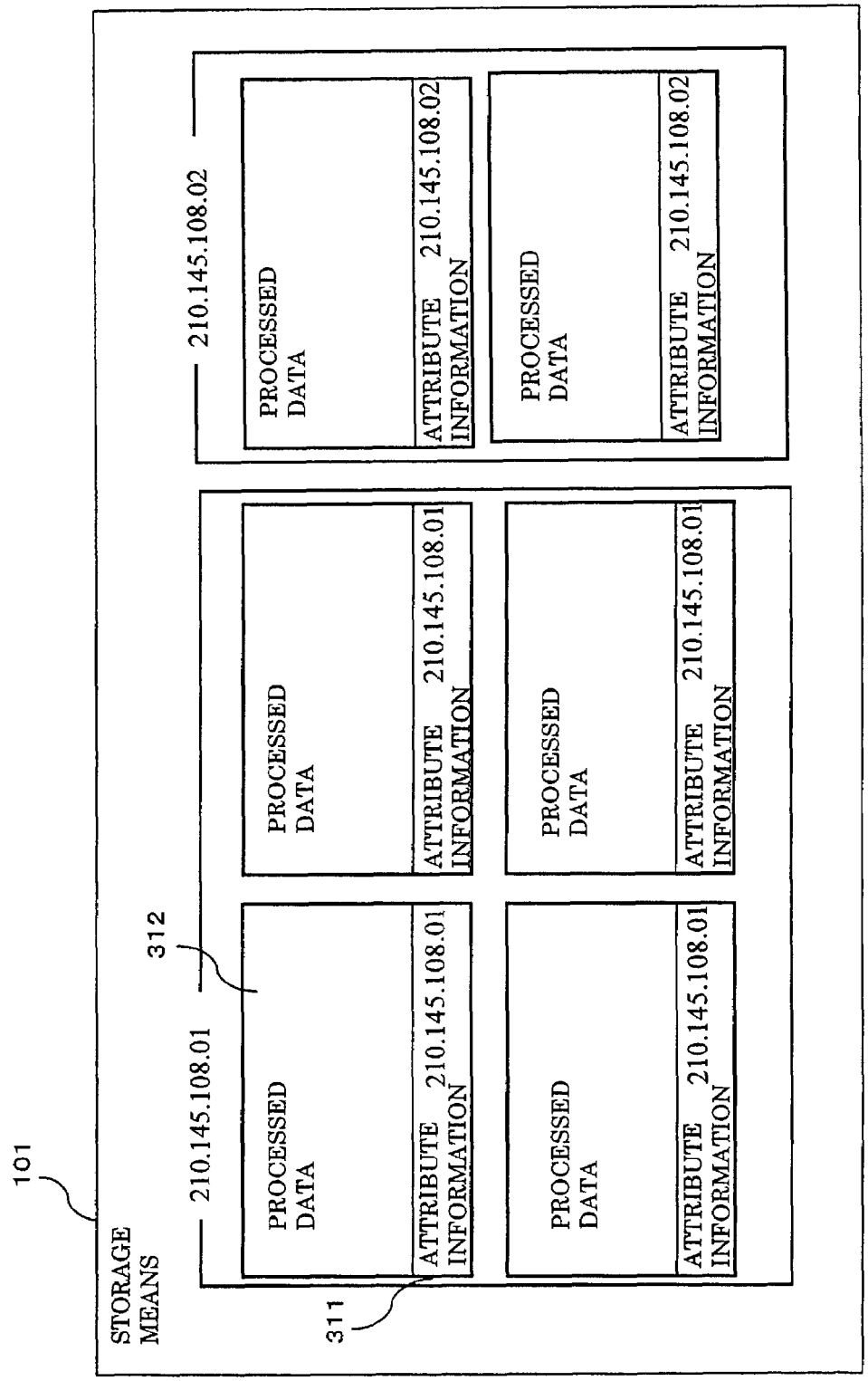
FIG. 16 is a conceptual diagram showing the attribute information in which the processed data and the directory name storing the processed data are described.

In case where the specifying information 201 transmitted from the output device 120B is IP address ("210.145.108.01", for example), the acquiring means 102 uses "210.145.108.01" as the directory name that is the storage location storing the processing object data 212. Thereby, the processing object data 212 transmitted from the output device 120B of IP address (210.145.108.01) is to be stored all in the directory of "210.145.108.01", as shown in FIG. 16.

In addition, when the acquiring means 102 acquired the processing object data 212 from Website, CD-R, DVD-R, or SD-card as above, URL (Uniform Resource Locator) of Website or a type name of the storage medium may be used as the directory name of the processing object data 212.

Likewise, the specifying information 201 of the mobile phone 120B transmitting the output request may be used as the directory name to which the registering means 111 in Embodiment 3 stores the processed data 312.

In this case, in order to inform the registering means 111 of the specifying information 201 of the mobile phone 120B transmitting the output request, the processing means 105 transfers to the registering means 111 the specifying information 201 transferred from the extracting means 104 together with the processed data 312 and the attribute information 311.

For instance, if the specifying information 201 transferred from the processing means 105 is IP address (210.145.108.01) of the mobile phone 120B, the registering means 111 uses "210.145.108.01" as the directory name of the storage location storing the processed data 312. Thereby, the processed data 312 generated according to the output capability information 202 of the monitor 121 of the mobile phone 120B is to be stored all in the directory "210.145.108.01".

As described above, at receiving the output request from the output request device 120A, the data processing control apparatus 100 processes the processing object data 212 to a format adapted for the output capability of the output means (monitor) 121 of the output device 120B, and then outputs the processed processing object data 212 (processed data 312) to the output device 120.

Therefore, the data processing control apparatus 100 converts the resolution so as to uniform the number of pixels of the processing object data 212 to the number of dots of the display means 121 and then outputs said data to the output device 120B, so that the whole of processing object data 212 can be displayed on the display means 121 even if the number of pixels of the processing object data 212 is larger than the number of dots of the display means 121 of the output device 120B.

In addition, deleting the specific pixels of the processing object data 212 makes it possible to output to the display means 121 the only part of processing object data that the user of the mobile phone 120B desires.

The processing of the processing object data 212 is performed on the side of the data processing control apparatus 100, in result the output request device 120A and the output device 120B have no concern with the processing of the processing object data 212, so that it will not occur that CPU and etc. of the output request device 120A and the output device 120B are occupied for the processing.

What is claimed is:

1. A data processing control apparatus outputting specific data to an output device in response to an output request transmitted from an output request device, comprising:
    providing means for providing processing object data, attribute information thereof, and output capability information of the output device to processing means based on the attribute information specifying the processing object data acquired with the output request;
    the processing means for processing the processing object data to processed data based on the attribute information and the output capability information of the output device; and
    output means for outputting the processed data to the output device.

2. The data processing control apparatus according to claim 1, wherein the providing means is storage means for storing the processing object data, the attribute information thereof, and the output capability information.

3. The data processing control apparatus according to claim 1, wherein the providing means is storage means for storing the processing object data and the attribute information thereof, and communication control means for receiving the output capability information from the output device.

4. The data processing control apparatus according to claim 1, wherein the providing means is communication control means for receiving from an external device the processing object data, the attribute information thereof, and the output capability information.

5. The data processing control apparatus according to claim 4, wherein the external device for providing the output capability information is the output device or the output request device.

6. The processing control device according to claim 2, further comprising:
    extracting means for outputting the attribute information specifying the processing object data to the specific output request device, in response to an extracting request of the processing object data for the output request device received before the output request; and
    the providing means for providing the specific processing object data selected by the output request device to the processing means in response to the output request of said data.

7. The data processing control apparatus according to claim 3, further comprising acquiring means for storing in the storage means the output capability information acquired by the communication control means.

8. The data processing control apparatus according to claim 7, wherein the acquiring means stores in the storage means the processing object data and the attribute information obtained by the communication control means.

9. The data processing control apparatus according to claim 2, further comprising registering means for storing the processed data and the attribute information to the storage means.

10. The data processing control apparatus according to claim 9, wherein the registering means stores to the storage means specifying information specifying the output device correlating with the processed data and the attribute information.

11. The data processing control apparatus according to claim 1, wherein the output device is the same as the output request device.

12. The data processing control apparatus according to claim 1, wherein the output device is different from the output request device.

13. The data processing control apparatus according to claim 1, wherein the output means includes information that the processing object data has been processed in the attribute information.

14. The data processing control apparatus according to claim 1, wherein the attribute information is composed of at least one of the file name, the resolution, the file format, and the data size of the processing object data.

15. The data processing control apparatus according to claim 1, wherein the attribute information of the processing object data includes history information of the processing object data, and the processing means decides to process the processing object data or not based on the history information and the output capability information.

16. The data processing control apparatus according to claim 15, wherein the history information indicates whether the processing object data has been processed or not.

17. The data processing control apparatus according to claim 16, wherein the processing means adds to the history information specifying information specifying the output device of which output capability information is used at processing the processing object data.

18. The data processing control apparatus according to claim 1, wherein the processing is the resolution conversion of the processing object data.

19. The data processing control apparatus according to claim 1, wherein the processing is to delete a specific area of the processing object data.

20. The data processing control apparatus according to claim 1, wherein the output device is a portable terminal or a receiver provided with Set Top Box.

21. The data processing control apparatus according to claim 10, wherein the specifying information is IP address.

22. The data processing control apparatus according to claim 7, wherein the acquiring means inquires of the output device the output capability information in response to the output request from the output request device to output the processing object data to the output device.

23. The data processing control apparatus according to claim 1, further comprises selecting means for selecting the output device to which the processing object data is outputted in response to the output request of the processing object data on the basis of the output capability information, and the attribute information of the processing object data included in the output request.

24. The data processing control apparatus according to claim 23, wherein the output device is a printing device and the output request is a print request.

25. The data processing control apparatus according to claim 1, wherein the output request contains at least one of the processing object data, the attribute information, and the output capability information.

26. A data processing control method outputting specific data to an output device in response to an output request transmitted from an output request device, comprising the steps of:
 providing processing object data, attribute information thereof, and output capability information of the output device to the processing means based on the attribute information specifying the processing object data acquired with the output request;
 processing the processing object data to processed data based on the attribute information and the output capability information of the output device; and
 outputting the processed data to the output device.

27. The data processing control method according to claim 26, further comprising the step of selecting the output device to which the processing object data is outputted on the basis of the output capability information, and the attribute information of the processing object data included in the output request in response to the output request of the processing object data.

28. The data processing control method according to claim 27, wherein the output device is a printing device and the output request is a print request.

29. The data processing control method according to claim 26, further comprising the steps of:
 providing battery charger with the output device; and
 acquiring the processing object data and the attribute information thereof from the output device provided to the battery charger and then storing the acquired processing object data and attribute information thereof in the storage means.

30. A data processing control system outputting specific data to an output device in response to an output request transmitted from an output request device,
 wherein the data processing control apparatus comprises:
 providing means for providing processing object data, attribute information thereof, output capability information of the output device to processing means based on the attribute information specifying the processing object data acquired with the output request;
 the processing means for processing the processing object data to processed data based on the attribute information and the output capability information of the output device; and
 output means for outputting the processed data to the output device,
 wherein the output request device comprises communication control means for transmitting the output request and the attribute information specifying the processing object data to the providing means.

31. The data processing control system according to claim 30, further comprising selecting means for selecting the output device to which the processing object data is outputted on the basis of the output capability information, and the attribute information of the processing object data in response to the output request of the processing object data.

32. The data processing control system according to claim 31, wherein the output device is a printing device, and the output request is a print request.

33. The data processing control system according to claim 30, wherein the output device is the same as the output request device.

34. The data processing control system according to claim 30, wherein the output device is different from the output request device.

35. The data processing control system according to claim 30, wherein the data processing control apparatus comprises acquiring means for inquiring of the output device the output capability information in response to the output request to transmit the processing object data from the output request device to the output device.

* * * * *